(12) United States Patent
Houel

(10) Patent No.: US 11,168,025 B2
(45) Date of Patent: Nov. 9, 2021

(54) COMPOSITE SYSTEM AND CONSOLIDATION METHOD, IN PARTICULAR FOR STRUCTURES MADE FROM REINFORCED CONCRETE OR MASONRY HARDENABLE OR HARDENED MATRIX AND TEXTILE REINFORCING MESH FORMING THIS SYSTEM

(71) Applicant: PAREXGROUP SA, Issy-les-moulineaux (FR)

(72) Inventor: Eric Houel, Saint Quentin Fallavier (FR)

(73) Assignee: PAREXGROUP SA, Issy-les-Moulineaux (FR)

( * ) Notice: Subject to any disclaimer, the term of this patent is extended or adjusted under 35 U.S.C. 154(b) by 467 days.

(21) Appl. No.: 15/747,892

(22) PCT Filed: Jul. 29, 2016

(86) PCT No.: PCT/FR2016/051991
§ 371 (c)(1),
(2) Date: Jan. 26, 2018

(87) PCT Pub. No.: WO2017/017393
PCT Pub. Date: Feb. 2, 2017

(65) Prior Publication Data
US 2018/0230050 A1    Aug. 16, 2018

(30) Foreign Application Priority Data
Jul. 30, 2015  (FR) ...................................... 1557336

(51) Int. Cl.
*C04B 24/26* (2006.01)
*D03D 19/00* (2006.01)
(Continued)

(52) U.S. Cl.
CPC ...... *C04B 24/2641* (2013.01); *C04B 24/2611* (2013.01); *C04B 24/2623* (2013.01);
(Continued)

(58) Field of Classification Search
CPC ............ C04B 24/2641; C04B 24/2676; C04B 24/2623; C04B 24/2611; D03D 15/0088;
(Continued)

(56) References Cited

U.S. PATENT DOCUMENTS 4,320,160 A   3/1982  Nishimura et al.
8,796,163 B2* 8/2014  Okada .................... D03D 11/00
                                                        428/223

FOREIGN PATENT DOCUMENTS

DE      41 30 146      3/1993
DE      195 25 508     2/1996
(Continued)

OTHER PUBLICATIONS

Jan. 10, 2020 Office Action issued in Chinese Patent Application No. 201680044349.2.
(Continued)

*Primary Examiner* — Elizabeth C Imani
(74) *Attorney, Agent, or Firm* — Oliff PLC

(57) ABSTRACT

The invention concerns a composite system for reinforcing, in particular, structures made from reinforced concrete or masonry comprising a curable or cured matrix and a textile reinforcement grid, and said two elements taken as such. The aim of the invention is for this system to make it possible to produce a cured composite structure having improved mechanical properties, both in the short term and in the long term (e.g. flexing behaviour, hardness, bending/compression resistance, durability, cohesion). This aim is achieved by the system of the invention in which the grid comprises at least one layer formed: —both from a framework consisting of
(Continued)

flat warp yarns and weft yarns; —and from a network binding the framework; characterised in that the binding network is such that it ensures the geometric regularity and dimensional stability of the meshes of the framework, before the grid is applied to the structure to be reinforced. The invention also concerns a method for reinforcing, in particular, structures made from reinforced concrete or masonry, the composite structure obtained from this method, the dry and wet formulations of the curable matrix, and consolidated structures, in particular made from reinforced concrete or masonry.

13 Claims, 9 Drawing Sheets

(51) Int. Cl.
    *D03D 15/00* (2006.01)
    *D03D 15/02* (2006.01)
    *E04G 23/02* (2006.01)
    *D03D 15/46* (2021.01)
    *D03D 15/593* (2021.01)

(52) U.S. Cl.
    CPC ......... *C04B 24/2676* (2013.01); *D03D 15/46* (2021.01); *D03D 15/593* (2021.01); *D03D 19/00* (2013.01); *E04G 23/0218* (2013.01); *D10B 2505/02* (2013.01); *E04G 2023/0251* (2013.01)

(58) Field of Classification Search
    CPC .... D03D 19/00; D03D 15/02; E04G 23/0218; E04G 2023/0251; E04G 23/02; D10B 2505/02

USPC ..................................................... 442/50, 58
See application file for complete search history.

(56) References Cited

FOREIGN PATENT DOCUMENTS

| | | |
|---|---|---|
| EP | 0 135 374 | 3/1985 |
| EP | 0 387 968 | 9/1990 |
| EP | 0 994 223 | 4/2000 |
| EP | 1 245 547 | 10/2002 |
| EP | 1 893 793 B1 | 9/2010 |
| JP | 2001-226849 | 8/2001 |
| JP | 2003-119641 A | 4/2003 |
| KR | 101 308 513 | 9/2013 |
| KZ | 2008-150725 A | 7/2008 |
| WO | 2007/054388 | 5/2007 |
| WO | 2012/020302 | 2/2012 |
| WO | 2012/123682 | 9/2012 |
| WO | 2013/020950 A2 | 2/2013 |

OTHER PUBLICATIONS

Bixia, Cai et al., "Structures and Designs of Weaves", Textile Industry Press, (Dec. 1980), pp. 162-167.
Nov. 28, 2019 Office Action issued in Chilean Patent Application No. 2018-000248.
Jun. 24, 2020 Office Action issued in Chinese Patent Application No. 201680044349.2.
Jun. 9, 2020 Office Action issued in British Patent Application No. GB1801454.8.

* cited by examiner of PCT/FR2016/051991 filed
COMPOSITE SYSTEM AND CONSOLIDATION METHOD, IN PARTICULAR FOR STRUCTURES MADE FROM REINFORCED CONCRETE OR MASONRY HARDENABLE OR HARDENED MATRIX AND TEXTILE REINFORCING MESH FORMING THIS SYSTEM This application is a 371 of PCT/FR2016/051991 filed Jul. 29, 2016.

TECHNICAL FIELD

The technical field of the invention is that of consolidation, in particular for structures made from reinforced concrete or masonry, such as buildings and civil engineering structures (bridges, tunnels, pipes, etc.).

In particular, the invention relates to a composite consolidation system, in particular for structures made from reinforced concrete or masonry, comprising a hardenable or hardened matrix and a textile reinforcing mesh, as well as these two elements taken individually.

A further subject of the invention is a consolidation method, in particular for structures made from reinforced concrete or masonry, as well as the composite structure obtained as a result of this method.

The invention also relates to thy and wet formulations of the hardenable matrix, which is preferably a hydraulic matrix.

The consolidated structures, in particular structures made from reinforced concrete or masonry, also form an integral part of the invention.

Technological Background

Structures made from reinforced concrete or masonry are edifices that can be made from reinforced concrete or other blocks, brick, pebble stone, cement, stucco, lath, grit stone, quarry stone, mortar, breeze block, stone, rammed earth, plaster and bricklaying cement. These edifices are subject to damage caused by the stresses exerted and/or climatic or environmental attacks of all kinds, including seismic, and/or possibly by defective design and/or workmanship.

In addition, the use of a building may change. A dwelling may, for example, become premises for an industrial service business. Such a change may go hand in hand with a change in the stresses exerted on the building. This might be, for example an increase in the load that a floor can support.

All of these causes require a structural reinforcement of the buildings in question.

Some known reinforcement methods consist of bonding carbon fibre fabric or strips to the structural elements (floors, beams, walls, columns, tunnels, pipes). These fabrics or strips are impregnated with hardenable resin (epoxy resin) and secured to these structural elements. After rapid hardening of the resin, a carbon fabric or strip/resin composite is obtained that increases the mechanical strength, as well as the ductility, of the consolidated structure.

These known methods have two major drawbacks:
 the epoxy resins must only be applied to dry substrates (they do not bond to damp concrete);
 with regard to health, they are potentially toxic and polluting and are capable of emitting hazardous fumes in the event of a fire.

Patent application DE19525508A1 also discloses a method for improving the durability of concrete or masonry building components by means of a multi-layer coating obtained by applying, on at least one surface of said building components, a mineral matrix formed by a layer of hydraulic mortar [cement (1): ash (0.33): water (0.36): styrol/acrylate dispersion (0.12)], which is reinforced by a mesh or porous textile based on glass, carbon or aramid fibres, and has a modulus of elasticity greater than 20,000 N/mm$^2$, an elongation at break greater than 0.4% and surface densities greater than 75 g/m$^2$. The mesh or porous textile is embedded in the unhardened mortar. These operations of forming a layer of hydraulic mortar and embedding a mesh or a porous textile are repeated at least once. Each time, the mesh or porous textile is thoroughly embedded in the layer of unhardened mortar, to form a hardened composite in which the hardened mortar forms a matrix thoroughly interpenetrated by the mesh or porous textile.

European patent EP0994223B1 discloses a heat-treated fabric that can be used as a reinforcement in building work, in which the warp is constituted by threads the fibres of which (12K 800 tex carbon threads) have high moduli, a tensile modulus of elasticity greater than 10 GPa and a tensile elastic limit greater than 600 MPa, and in which the weft is constituted by glass threads (60 tex) coated with a thermoadhesive polymer material (40 tex/hot melt polyamide) the melting temperature of which is comprised between 40 and 250° C. The quantity of thermoadhesive polymer material is between 10 and 300% by weight with respect to the glass threads. This fabric is applied to building structures by means of an impregnating resin. To this end, the surface of the building structure in question is coated with a layer of impregnating resin, the reinforcing fabric is embedded in this first layer, a second layer of impregnating resin is applied, more reinforcing fabric is embedded in this second layer and a third layer of impregnating resin is applied thereto.

European patent EP1245547B1 describes a cement mortar intended to be used for reinforcing building components, in combination with synthetic fibre meshes (carbon, aramid, glass, polyethylene/polyester or other fibre) the mesh size of which is comprised between 10 and 35 mm. The mortar comprises cement, a plasticising copolymer resin, a thixotropic additive derived from cellulose such as methyl hydroxyethyl cellulose or methyl cellulose, a fine filler for example based on quartz (500 microns), fly ash or a marble powder and optionally silica, together with other additives.

European patent EP1893793B1 proposes an improvement to the reinforcing meshes used in the means of consolidating building components disclosed by EP1245547B1. This improvement consists in that the fibres constituting said reinforcing meshes are poly(benzo[1,2d:5,4-d']bisoxazole-2,6-diyl-1,4-phenylene) fibres.

Technical Problem—Aims of the Invention

All of these technical proposals of the prior art are marginal adjustments, which do not enable significant improvements to be obtained, in particular in the mechanical properties of the reinforcing composite structures (cementitious matrix/carbon and/or glass fabric) for buildings or civil engineering structures.

In this context, the technical problem addressed by the present invention is that of achieving at least one of the aims set out below:
 (i) Providing a composite system for consolidating structures made from reinforced concrete or masonry comprising a hardenable or hardened matrix and a textile reinforcing mesh, making it possible to produce a hardened composite structure with improved mechanical properties, in both the short term and the long term (e.g. sagging behaviour, hardness, bending/compressive strength, durability, cohesion).

(ii) Providing a composite system for consolidating structures made from reinforced concrete or masonry comprising a hardenable or hardened matrix and a textile reinforcing mesh, making it possible to produce a hardened composite structure that is mechanically strong and sufficiently ductile for optimum performance of its role of consolidating structures made from reinforced concrete or masonry.

(iii) Providing a composite system for consolidating structures made from reinforced concrete or masonry comprising a hardenable or hardened matrix and a textile reinforcing mesh, making it possible to produce a hardened composite structure, mechanically efficient and bonding completely to the substrate to be consolidated, in particular in damp application conditions.

(iv) Providing a composite system for consolidating structures made from reinforced concrete or masonry comprising a hardenable or hardened matrix and a textile reinforcing mesh, making it possible to produce a hardened composite structure that is mechanically efficient and for which the textile reinforcing mesh can be manufactured easily on an industrial scale.

(v) Providing a composite system for consolidating structures made from reinforced concrete or masonry comprising a hardenable or hardened matrix and a textile reinforcing mesh, making it possible to produce a hardened composite structure that is mechanically efficient and easy to apply by an operator during consolidation.

(vi) Providing a composite system for consolidating structures made from reinforced concrete or masonry comprising a hardenable or hardened matrix and a textile reinforcing mesh, making it possible to produce a hardened composite structure that is mechanically efficient and does not require particular storage conditions for either the reinforcing mesh or the matrix.

(vii) Providing a composite system for consolidating structures made from reinforced concrete or masonry comprising a hardenable or hardened matrix and a textile reinforcing mesh, making it possible to produce a hardened composite structure that is mechanically efficient and cost-effective.

(viii) Providing a composite system for consolidating structures made from reinforced concrete or masonry comprising a hardenable or hardened matrix and a textile reinforcing mesh, making it possible to produce a hardened composite structure that is mechanically efficient and durable.

(ix) Providing a composite system for consolidating structures made from reinforced concrete or masonry comprising a hardenable or hardened matrix and a textile reinforcing mesh, making it possible to produce a hardened composite structure that is mechanically efficient regardless of the morphology of the structure to be consolidated, in particular in the case of pipes, in particular sewerage system pipes.

(x) Providing a composite system for consolidating structures made from reinforced concrete or masonry comprising a hardenable or hardened matrix and a textile reinforcing mesh, making it possible to line pipes easily in order to consolidate them, in particular sewerage system pipes.

(xi) Providing a composite system for consolidating masonry structures comprising a hardenable or hardened matrix and a textile reinforcing mesh, making it possible to produce a hardened composite structure that is mechanically efficient and eco-compatible, i.e. avoiding as far as possible the use of compounds that might be harmful to operators and/or the environment.

(xii) Providing a composite system for consolidating structures made from reinforced concrete or masonry comprising a hardenable or hardened matrix and a textile reinforcing mesh, making it possible to produce a hardened composite structure that is mechanically efficient, in which the hardenable matrix is a dry composition (e.g. cementitious) resulting, after mixing with a liquid (e.g. water), in an easily sprayable wet formulation that is easy to use, having a paste-like consistency and viscosity enabling pumping by a gun and sufficiently long workability to perform the mixing and application of the consolidation structure, while remaining cost-effective, and stable after mixing.

(xiii) Providing a composite structure obtained using the system as set out in aims (i) to (xii) above, that is mechanically efficient, easy to produce in a variety of contexts, and cost-effective.

(xiv) Providing a composite structure obtained using the system as set out in aims (i) to (xii) above, that can be used to increase the resistance to seismic loads of structures made from reinforced concrete or masonry.

(xv) Providing a method for consolidating structures made from reinforced concrete or masonry, by means of the system as set out in aims (i) to (xii) above, that is easy to implement in a variety of contexts, while remaining cost-effective.

BRIEF DESCRIPTION OF THE INVENTION

It is to the inventors' credit that they have highlighted that one of the key points for this type of matrix/textile reinforcement composite structures lies in optimising the anchoring of the matrix in the textile reinforcement. In particular, the inventors have noted that it is important to have good interpenetration and regular interpenetration of the cementitious matrix through the openings in the reinforcing fabric. Homogeneous trapping of the reinforcing fabric by the cementitious matrix is a way of preventing mechanical shear phenomena, which are capable of reducing the consolidation sought to zero.

Backed by these findings, the inventors are proposing a solution to the problem set out in all or some of the aims listed above. This solution lies at least partly in the use of a textile reinforcement comprising means of geometric and dimensional stabilisation of the network.

It follows that the present invention relates, in a first aspect thereof, to a composite system for consolidating structures, in particular structures made from reinforced concrete or masonry, comprising a hardenable or hardened matrix and a textile reinforcing mesh, in which the mesh comprises at least one layer formed:
  on the one hand, by a reinforcement constituted by intersecting flat warp threads and weft threads;
  and on the other hand, by a binding network of the reinforcement;
  characterized in that the binding network is such that it ensures the dimensional stability under stress of the links of the reinforcement, before the mesh is applied to the structure to be consolidated.

This particular binding network according to the invention makes it possible to obtain, ultimately, a composite structure for consolidating structures, in particular structures made from reinforced concrete or masonry, having the required mechanical properties in terms of strength and ductility, in terms of bonding to the substrate to be consolidated and in terms of ease of use and storage.

According to other aspects thereof, the invention relates to the following elements taken individually and independently of each other: the textile reinforcing mesh, the hardenable matrix in the form of a dry composition and the hardened composite matrix/mesh structure applied to the structure to be consolidated.

In particular, the invention relates to a composite structure having a tensile modulus of elasticity TME less than or equal to—MPa where, in increasing order of preference—is 100,000, 80,000, 70,000.

According to another aspect thereof, the invention relates to a composite structure having a tensile modulus of elasticity TME less than or equal to—MPa where, in increasing order of preference, —is 100,000, 80,000, 70,000, to increase the resistance to seismic loads of a reinforced concrete or masonry structure, said structure being obtained based on a composite system for consolidating structures, comprising a hardenable or hardened matrix and a textile reinforcing mesh, in which the mesh comprises at least one layer formed by a reinforcement constituted by flat warp threads and weft threads and has dimensional stability under stress of the links of the reinforcement, before the mesh is applied to the structure to be consolidated.

According to another aspect thereof, the invention also relates to a method for consolidating a structure, characterized in that it consists of press-mounting the mesh according to the invention on the structure with the matrix according to the invention, after having mixed said matrix with a liquid, preferably water, to obtain a hardenable wet matrix.

According to another aspect thereof, the invention relates to a wet formulation comprising the matrix according to the invention, mixed with a liquid, preferably water, as well as a method for preparing this wet formulation.

According to another aspect thereof, the invention relates to the use of a mesh according to the invention for consolidating a structure, in particular a reinforced concrete or masonry structure, by press-mounting using a wet formulation according to the invention.

Definitions

Throughout the present description, all singulars can equally well denote the singular or the plural.

The definitions given below by way of example can be used to interpret the present description:

"mortar" denotes a dry or wet or hardened mixture of one or more organic and/or mineral binders, particles with a diameter <5 mm (sands—aggregates) and optionally fillers and/or additives and/or admixtures.

"approximately" means to within 10%, or to within 5%, with respect to the unit of measurement used.

The term "d50", which refers in this description to the particle size criterion, denotes the median diameter. This means that 50% of the particles are smaller than "d50". The particle size is measured by sieving in accordance with EN 12192-1.

DETAILED DESCRIPTION OF THE INVENTION

Mesh

The mesh according to the invention has at least one essential feature to obtain optimum reinforcement of the material to which the system is applied:

The dimensional stability under stress of the mesh.

This feature is preferably combined with the following additional feature:

The geometric regularity of the mesh, which enables homogeneous take-up of the loads over the entire area covered by the reinforcement.

The dimensional stability under stress and, advantageously, the geometric regularity, directly influence the ability of the mesh to take up the forces evenly over the entire surface area thereof affected by the reinforcement.

Dimensional stability under stress is qualified as follows in a test ST defined below:

The deformation of a 40×40 cm sample suspended by its two top corners in a vertical plane and subjected to the tensile stress of a 1 kg (deformation D1) or 2 kg (deformation D2) weight attached to the middle of the bottom edge of the sample, is such that:

D1 is less than or equal to—cm, where, in increasing order of preference,—is: 2.5; 1.5; 1.0; 0.8; 0.6; 0.5; 0.3; 0.2; 0.1;

D2 is less than or equal to—cm, where, in increasing order of preference, —is: 5; 4; 3; 2; 1.8; 1.6; 1.5; 1.4; 1.2; 1.0.

Geometric regularity can also be evaluated by a test RT defined below:

The standard deviation as a % with respect to the mean of the surface areas of a random panel of 20 openings of the reinforcement (in the attached figures, the reinforcement is denoted by reference sign 2 and the openings or links of this reinforcement are denoted by reference sign 4—FIGS. 1 & 7) or a panel of 20 openings of the binding network (in the attached figures, the binding network is denoted by reference sign 3, and the openings or links of this binding network are denoted by reference sign 5—FIG. 7), of a 40×40 cm sample of mesh is less than or equal to 15%, preferably 10% and even more preferably 8%.

This dimensional stability under stress of the mesh, and, advantageously, the geometric regularity of this mesh, in particular just after it is manufactured, or after it is packed into rolls just after manufacturing, guarantee its ability to not deform and are provided, in particular, by the binding network of the reinforcement.

According to a remarkable aspect of the invention, the dimensional stability under stress, or the geometric regularity, are promoted by the coating of the mesh, which makes it possible to "fix" the assembly during the process of producing the mesh and ensures almost perfect dimensional stability of the mesh during the stresses that can occur during the handling steps preceding its installation, and on the positioning of the reinforcement. Thus, according to a preferred feature of the invention, at least a part of the threads of the mesh are coated/impregnated with at least one polymer, preferably selected from the group comprising, or even better constituted by:

(meth)acrylic (co)polymers, advantageously selected from the sub-group comprising, or even better constituted by, alkyl ester copolymers advantageously comprising 1 to 8 carbon atoms, with acrylic acid, or methacrylic acid, in particular those selected from the family comprising, or even better constituted by, preferably methyl acrylate, ethyl acrylate, butyl acrylate, 2-ethyl hexyl acrylate and correspondents thereof with methacrylic acid; and mixtures thereof;

vinyl ester (co)polymers advantageously selected from the sub-group comprising, or even better constituted by, vinyl acetate homopolymers and copolymers, in particular those selected from the family comprising, or even better constituted by, ethylene vinyl acetate copolymers, vinyl chloride (co)polymers such as ethylene vinyl chloride copolymers, vinyl laurate (co)polymers, vinyl versatate (co)polymers, vinyl ester (co)polymers of alpha-monocarboxylic acids, saturated or not, branched or not, advantageously comprising 9 or 10 carbon atoms, homopolymers of alkyl carboxylic acid vinyl esters, saturated or not, branched or not, advantageously comprising 3 to 8 carbon atoms, copolymers of the latter homopolymers with ethylene, vinyl chloride, and/or other vinyl esters; and mixtures thereof;

styrene (co)polymers with butadiene or with one or more acrylic esters advantageously selected from the sub-group comprising, or even better constituted by, ethylenically unsaturated alkyl esters advantageously comprising from 1 to 8 carbon atoms of (meth)acrylic acid, preferably methyl acrylate, ethyl acrylate, butyl acrylate, 2-ethylhexyl acrylate and correspondents thereof with methacrylic acid, and mixtures thereof;

hot-melt (co)polymers, advantageously selected from the sub-group comprising, or even better constituted by, polyethylenes, polypropylenes, polyesters, polyamides, Ethylene Propylene Diene Monomer (EPDM) copolymers, and mixtures thereof;

and mixtures thereof.

Advantageously, the number of intersections of the binding threads in each opening of the non-woven reinforcement is less than or equal to four, preferably less than or equal to 2, and even more preferably equal to 1. The openings of the reinforcement are not excessively obstructed by the binding network.

According to a remarkable feature of the invention, the mesh comprises carbon in a quantity (in $g/m^2$) comprised within the following ranges, in increasing order of preference: [150-500]; [170-300]; [180-280]; [190-260]; [200-250].

The invention also relates to the consolidation mesh taken individually, independently of the system according to the invention.

This consolidation mesh for structures made from reinforced concrete or masonry is characterized in that it comprises at least one layer formed on the one hand, by a reinforcement constituted by flat warp threads and weft threads;

and, on the other hand, by a binding network of the reinforcement;

and in that the binding network is such that it ensures the geometric regularity and dimensional stability of the links of the reinforcement, before the mesh is applied to the structure to be consolidated.

Advantageously, this mesh as defined in the present description, the example and the figures, is preferably in the form of rolls or in the form of panels.

Reinforcement

The reinforcement is woven or non-woven, preferably non-woven.

Advantageously, the weft threads and the warp threads of the reinforcement are comprised in two parallel planes.

In practice, the weft threads of the reinforcement are preferably arranged on the warp threads of this reinforcement, said warp threads forming the face of the reinforcement intended to be placed in contact with the structure to be consolidated.

The overlaying of the weft threads on the warp threads makes it possible to obtain a flat, straight surface.

According to a remarkable aspect of the invention, the weft threads and the warp threads of the reinforcement are each constituted by a bundle of filaments and have at least one of the following features:

i. The filaments of a bundle are based on one or more materials selected from the group comprising, or even better constituted by, carbon, glass, basalt, metals, plant materials, advantageously selected from the sub-group comprising, or even better constituted by, hemp and synthetic materials, and advantageously selected from the sub-group comprising, or even better constituted by, aramid, poly(benzo[1,2-d:5,4-d']bisoxazole-2,6-diyl-1, 4-phenylene), polyethylene, polypropylene, polyamides, polyimides, polyesters;

carbon being preferred;

ii. The tensile strength (in MPa) of each thread is comprised within the following ranges, in increasing order of preference: [1,000-10,000]; [2,000-8,000]; [3,000-7,000];

iii. The tensile modulus (in GPa) of each thread is within the following ranges, in increasing order of preference: [150-700]; [200-400];

iv. The elongation (as a %) of each thread is within the following ranges, in increasing order of preference: [0.1-6]; [0.5-3.5]; [1-2.5].

According to this feature (i), the filaments of a bundle can all be produced from one and the same material, or can be produced from different materials, each filament being produced from a single material (for example metal filaments/plant material filaments, e.g. hemp), or can be produced from one and the same material and/or different materials, each filament being produced from several materials. All combinations can be envisaged for a single bundle or for all or part thereof.

In a preferred embodiment of the invention, the warp threads and the weft threads of the reinforcement are each constituted by a bundle of batched filaments or fibres, preferably carbon.

These filaments or fibres, preferably carbon, are not mechanically linked to each other, so that depending on the tension of the threads, the width and thickness thereof can vary.

By way of example of a commercial reference for carbon threads suitable for being used to form the warp and weft threads of this weave, there may be mentioned the threads marketed under the TORAYCA® brand by Soficar, under product references FT300/T300, T300J, T400H, T600S, T700S, T700G, T800H, T800S, T1000G, M35J, M40J, M46J, M50J, M55J, M60J, M30S, M40.

Binding Network

The threads of the reinforcement, preferably carbon, are bound by binding threads that form a network. The role of the binding threads is threefold. They make it possible to have a specific mesh geometry and a constant thread cross-section and to obtain two layers of carbon threads that are overlaid and not intertwined.

The preferably non-woven binding network of the reinforcement is a weave alkyl carboxylic acid vinyl esters of warp elements and weft elements, preferably a weave having at least one of the following features:
  i. the openings in the binding network are regular; this geometric regularity is preferably qualified as follows in a geometric regularity test RT defined in the description:
    the standard deviation as a % with respect to the mean of the surface areas of a random panel of 20 openings 5 in the binding network of a 40×40 cm mesh sample is less than or equal to 4%, preferably 3%, and even more preferably 2%;
  ii. the warp elements and the weft elements of this weave are parallel to the warp threads and the weft threads respectively of the reinforcement;
  iii. the intersections of this weave are arranged (viewed from the front) in the openings of the reinforcement.

Preferably, the weave forming the binding network of the reinforcement is a leno weave, each warp element of this weave comprising at least two binding threads, preferably two, and each weft element of this weave comprising at least one binding thread, preferably one.

Leno weave is a weave in which the two warp threads intersect around the weft threads, which provides excellent stability at the intersection points.

According to an advantageous variant of the invention, the mesh can be associated with a corrosion protection system for the metal reinforcements of the concrete structure to be consolidated. These means can be metal wires coated with mixed metal oxides (MMO) intended to form electrodes capable of allowing electrochemical action against the corrosion of the reinforcements of the reinforced concrete of the structure to be consolidated.

These MMO metal wires could be the binding threads.
Even more preferably:
  each warp element of the weave comprises two warp binding threads and each weft element of the weave comprises one weft binding thread,
  one of the two warp binding threads passes on the same side C1 of all of the weft threads of the reinforcement,
  the other warp binding thread passes on the same side C2, opposite C1, of all of the weft threads of the reinforcement,
  between two successive weft threads of the reinforcement, the warp binding threads intersect before the weft binding thread, pass on either side of weft binding thread and then intersect again to clasp the weft thread of the reinforcement.

According to advantageous aspects of the invention, the binding threads have at least one of the following features:
  i. The binding threads are based on one or more materials selected from the group comprising, or even better constituted by, carbon, glass, basalt, metals, plant materials, advantageously selected from the sub-group comprising, or even better constituted by, hemp, synthetic materials, and advantageously selected from the sub-group comprising, or even better constituted by, aramid, poly(benzo[1,2-d:5,4-d']bisoxazole-2,6-diyl-1,4-phenylene), polyethylene, polypropylene, polyamides, polyimides, polyesters;
    glass being preferred;
  ii. The size (in tex) of the binding threads forming the warp elements is comprised within the following ranges, in increasing order of preference: [5-100]; [10-60]; [15-50]; [20-40];
  iii. The size (in tex) of the binding threads forming the weft elements is comprised within the following ranges, in increasing order of preference: [10-200]; [30-150]; [40-100]; [50-80];
  iv. The size (in tex) of the binding threads forming the warp elements is equal to 50±20% of the size (in tex) of the binding threads forming the weft elements.

In the preferred embodiment of the mesh according to the invention, the binding threads are made from glass (type E). These binding threads have good tensile strength. They are selected according to the invention so that they do not break when they are tensioned during the weaving of the mesh. In addition, they are rot-proof and non-flammable.

In a preferred embodiment:
  Each warp element is advantageously formed by two binding threads, for example 34 tex each, with product reference ECG 75.
  Each weft element is advantageously formed by one binding thread, for example 68 tex, with product reference ECG 150.

This configuration of 2 binding threads in the warp direction/1 binding thread in the weft direction with a tex equal to the sum of the tex of the other 2 threads makes it possible to avoid tensions in the rest of the reinforcement and obtain regularity in the geometry of the links.

The binding threads partly obstruct the links of the non-woven reinforcement. It is therefore preferable that the binding threads be as fine as possible, to limit the obstruction of these links and thus enable the matrix to pass through the mesh. This optimizes the anchoring of the matrix in the mesh and the mechanical properties of the matrix/mesh system, in particular with regard to shear strength.

This mesh is advantageously manufactured using conventional means known per se.

Matrix

The hardenable matrix can be mineral and/or organic.

A hardenable matrix preferably comprises one or more mineral and/or organic binders.

In a preferred embodiment, the hardenable matrix comprises (in parts by weight):
  100 of binder;
  1-4,000, and in increasing order of preference, 5-2,000; 10-1,000; 20-500 of mineral fillers;
  0.01-1,000, and in increasing order of preference, 0.05-800; 0.1-500; 0.5-200; 1-50 of at least one resin;
  0-500 of additives, preferably 0.01-50.

Binder

This binder is preferably mineral, and is even more preferably selected alone or in combination from the group comprising, and ideally constituted by:
  (i) Portland cements, slag cements, geopolymer cements, natural pozzolans, fly ash, slag, supersulphated cements, calcium sulphates (gypsum, hemihydrate and/or anhydrite), limes (quick, slaked and/or hydraulic), potassium, sodium and/or lithium silicates, and mixtures thereof;
  (ii) calcium aluminate-based cements (CAC) and/or calcium sulphoaluminate-based cements (CSA) and mixtures thereof;
  (iii) and mixtures thereof.

In a preferred embodiment of the matrix according to the invention, the binder is at least partly constituted by cement.

According to a variant, the binder is at least partly organic, selected from the group comprising, or ideally constituted by: epoxy (co)polymers, (co)polyurethanes, and mixtures thereof.

Mineral Fillers

Advantageously, the D50 of these mineral fillers is less than or equal to 1,000 µm, and more advantageously, less than or equal to 800 or even 700 µm.

These mineral fillers are preferably selected from the group comprising, or ideally constituted by:
- (i) the sub-group comprising, or even better constituted by: fillers and/or sands, preferably from siliceous, calcareous, silico-calcareous, magnesia sands and mixtures thereof, siliceous, calcareous, silico-calcareous, magnesia fillers and mixtures thereof, and/or from metal oxides, aluminas, and/or from glass beads and natural and synthetic silicate-containing minerals preferably selected from clays, micas, metakaolins, silica fumes and mixtures thereof;
- (ii) the sub-group of light fillers selected comprising, or even better constituted by: expanded perlite, expanded vermiculite, silica aerogels, expanded polystyrene, cenospheres (fillites), hollow alumina beads, expanded clays, pumices, hollow glass beads (3M® type) or expanded glass granules (Poraver®, Liaver®), silicate foam grains and rhyolite (Noblite®);
- (iii) and mixtures thereof.

Resins

These resins are selected from the group comprising, or ideally constituted by:
- (i) Unsaturated copolymer resins;
- (ii) Redispersible powder resins from the sub-group comprising, or even better constituted by, the families of acrylic homopolymer or copolymer resins, ethylene-vinyl acetate copolymers, styrene-acrylic copolymers, vinyl acetate, vinyl versatate and maleic acid dialkyl ester terpolymers, vinyl acetate and vinyl versatate copolymers, styrene and butadiene copolymers, and mixtures thereof;
- (iii) and mixtures thereof.

The aim of these resins is to increase bonding and elasticity.

By way of preferred examples, ethylene-vinyl acetate copolymers may be mentioned.

Additives

Advantageously, the matrix according to the invention comprises at least one of the following additives: a setting retarder, a setting accelerator, a water-retaining agent, a waterproofing agent, a colourant, fibres, an anti-foaming agent, a rheological agent, an air-entraining agent or foaming agent, a gas generator, a flame retardant.

Preferably, this hardenable matrix has at least one of the following features with respect to additives:
- the setting retarder is preferably selected from the group comprising, or even better constituted by, calcium chelating agents, carboxylic acids and salts thereof, polysaccharides and derivatives thereof, phosphonates, lignosulphonates, phosphates, borates, and lead, zinc, copper, arsenic and antimony salts, and more particularly from tartaric acid and salts thereof, preferably the sodium or potassium salts thereof; citric acid and salts thereof, preferably the sodium salt thereof (trisodium citrate), sodium gluconates; sodium phosphonates; sulphates and the sodium or potassium salts thereof, and mixtures thereof;
- the setting accelerator is selected from the group comprising, or even better constituted by, alkali and alkaline earth salts of hydroxides, halides, nitrates, nitrites, carbonates, thiocyanates, sulphates, thiosulphates, perchlorates of silica, aluminium, and/or from carboxylic and hydrocarboxylic acids and salts thereof, alkanolamines, insoluble silicate-containing compounds such as silica fumes, fly ash or natural pozzolans, silicate-containing quaternary ammonium compounds, finely divided mineral compounds such as silica gels or finely divided calcium and/or magnesium carbonates, and mixtures thereof; this additional setting accelerator preferably being selected from the group comprising, or even better constituted by, chlorides and the sodium or calcium salts thereof, carbonates and the sodium or lithium salts thereof, sulphates and the sodium or potassium salts thereof, calcium hydroxides and formates and mixtures thereof;
- the water-retaining agent is selected from the group comprising, or even better constituted by, polysaccharides, and preferably cellulose or starch ethers and mixtures thereof, and preferably from the group comprising methyl celluloses, hydroxyethyl celluloses, methyl hydroxypropyl celluloses, methyl hydroxyethyl celluloses and mixtures thereof, or from guar ethers, modified or not, and mixtures thereof or a mixture of these different families;
- the waterproofing agent is selected from the group comprising, or even better constituted by, fluorinated, silanized, siliconized and siloxanized agents, fatty acid metal salts and mixtures thereof, preferably from sodium, potassium and/or magnesium salts of oleic and/or stearic acid and mixtures thereof;
- the colourant is selected from the group comprising, or even better constituted by, organic and/or mineral pigments, and more particularly from iron, titanium, chromium, tin, nickel, cobalt, zinc, antimony oxides, and/or from sodium polysulphide aluminosilicates, carbon, cobalt, manganese, zinc sulphides, and/or from high-transparency or highly infrared-reflective pigments and mixtures thereof;
- the fibres comprise mineral, animal, plant and synthetic fibres, more particularly selected from the group comprising, or even better constituted by, polyamide, polyacrylonitrile, polyacrylate, cellulose, polypropylene, polyvinyl alcohol, glass, metal, linen, polycarbonate, sisal, jute and hemp fibres and mixtures of these fibres;
- the anti-foaming agent is selected from the group comprising, or even better constituted by, polyether polyols, hydrocarbon-containing molecules, silicone-containing molecules, hydrophobic esters, non-ionic surfactants, polyoxiranes, and mixtures thereof;
- the rheological agent is selected from the group comprising, or even better constituted by, thickening agents, plasticizers (mineral and/or organic) and mixtures thereof, and preferably from the sub-group comprising, or even better constituted by, polysaccharides and derivatives thereof, polyvinyl alcohols, mineral thickeners, linear polyacrylamides, polynaphthalene sulphonates, polymelamine sulphonates, polycarboxylates and mixtures thereof;
- the air-entraining agents or foaming agents are selected from:
  - i. sources of anionic surfactants, such as for example, alkyl sulphates, alkyl ether sulphates, alkaryl sulphonates, alkyl succinates, alkyl sulpho-succinates, alkoyl sarcosinates, alkyl phosphates, alkyl ether phosphates, alkyl ether carboxylates, and alpha olefin sulphonates, preferably sodium lauryl sulphate,
  - ii. non-ionic surfactants such as ethoxylated fatty alcohols, mono- or di-alkyl alkanolamides and alkyl polyglucosides, iii. amphoteric surfactants such as alkyl amine oxides, alkyl betaines, alkyl amidopropyl betaines, alkylsulphobetaines, alkyl glycinates, alkyl amphopropionates and alkyl amidopropylhydroxysultaines.

the in-situ gas generators are selected from products that generate, on contact with the matrix of the system according to the invention, oxygen, hydrogen, nitrogen, carbon monoxide or dioxide, ammonia, methane. They can be selected from the additives described in U.S. Pat. No. 7,228,147, and in particular from the families of azodicarbonamide, sodium bicarbonate, organic or inorganic peroxides, toluenesulphonylhydrazide, benzenesulphonyl hydrazide, toluenesulphonyl acetone hydrazone, toluenesulphonylsemicarbazide, phenyltetrazole, sodium borohydride or dinitroso-pentamethylenetetramine; the flame retardants are preferably selected from the group comprising, or even better constituted by, flame retarding agents having chemical and/or physical actions, halogenated flame retardants, phosphorus-containing flame retardants, nitrogen-containing flame retardants, intumescent systems, mineral flame retardants, metal hydroxides, zinc compounds, borates, antimony oxides, aluminium silicate clay nanocomposites, and mixtures thereof;

preferably from the sub-group comprising, or even better constituted by, tetrachlorobisphenol A (TBBPA), chloroparaffins, organic phosphates, red phosphorus, phosphonates, phosphinates, melamine and salts and homologues thereof, aluminium or magnesium hydroxides, zinc hydroxystannates, zinc borate, and mixtures thereof.

The role of these additives is to offer regularity of the properties of the material, and they make it possible to meet the precise specifications pertaining to each application of the dry (e.g. cementitious) composition: mortar, render, adhesive.

The additional setting retarders and setting accelerators are products that modify the solubilities, the dissolution and hydration rates of the various constituents of the dry cementitious composition.

The water-retaining agent has the property of retaining the mixing water before setting. The water is thus kept in the mortar or concrete mixture, which gives it a very good bond and good hydration. To a certain extent, it is absorbed less into the substrate, surface salting is limited and there is thus little evaporation.

The purpose of the waterproofing agent is to reduce the penetration of water into the dry compound or the hardened product. By way of example, sodium oleate and magnesium stearate may be mentioned.

The purpose of the colourant is to give the hardened product the desired hue. By way of example, iron oxide $FeO_3$ and titanium dioxide $TiO_2$ may be mentioned.

The purpose of the fibres is to improve the mechanical strength of the hardened product. By way of example, polyacrylonitrile fibres may be mentioned.

The anti-foaming agents are used in order to increase the cohesion of the mortar by limiting the presence of air bubbles. They make it possible to reduce the secondary effect of other additives or resulting from mixing, entraining air. By way of examples of anti-foaming agents, polyether polyols may be mentioned.

The purpose of the rheological agents is to modify the consistency of the wet product to suit the application thereof. By way of example, sepiolites, xanthan gums or silica fume may be mentioned.

The purpose of the foaming agents is to provide additional porosity by entraining air during the mixing of the mineral binder.

The purpose of the in-situ gas generators is to provide additional porosity by generating air in situ during the mixing of the mineral binder.

The flame retardants protect the hardened product against fire.

Hardened Composite Structure

A further object of the invention is the hardened composite structure obtained based on the system according to the invention as defined in the description, the example and the figures.

This hardened composite structure has a working temperature that corresponds to the average temperature of a structural element, resulting from the climatic temperatures in winter or summer and the operating temperatures as defined in NF EN 1991-1-5, paragraph 5.2. This temperature may reach at least 80° C. for example.

The invention also relates to a composite structure having a tensile modulus of elasticity TME less than or equal to—MPa where, in increasing order of preference, —is 100,000, 80,000, 70,000, as well as the use of such a structure to increase the resistance to seismic loads of a reinforced concrete or masonry structure, said structure being obtained based on a composite system for consolidating structures, comprising a hardenable or hardened matrix and a textile reinforcing mesh, in which the mesh comprises at least one layer formed by a reinforcement constituted by flat warp threads and weft threads and has dimensional stability under stress of the links of the reinforcement, before the mesh is applied to the structure to be consolidated.

Method for Consolidating Structures, in Particular Structures Made from Reinforced Concrete or Masonry According to another aspect thereof, the invention relates to the implementation of the system comprising the mesh according to the invention and the cementitious matrix, for consolidating a structure, in particular a reinforced concrete or masonry structure, such as the wall of a building, a tunnel, a pipe, a bridge pier, etc.

It thus relates to a method for consolidating structures made from reinforced concrete or masonry characterized in that it essentially consists of press-mounting the mesh as defined in the present description, the example and the figures, on the structure with the matrix as defined in the present description, the example and the figures, optionally after having mixed said matrix with a liquid, preferably water, to obtain a hardenable wet matrix.

More specifically, the hardenable wet matrix is advantageously sprayed onto the structure, preferably by means of a gun, the mesh is then positioned on the unhardened matrix and press-mounted, preferably using a trowel, and optionally the matrix is sprayed at least once more, preferably smoothing the surface of the matrix sprayed in this way with the trowel.

According to one possible implementation, the operations of spraying, positioning another mesh and press-mounting are repeated n times, with n comprised between 1 and 3; these operations can be carried out on the surface of the previously sprayed matrix that is unhardened or at least partly hardened.

In practice, the dry formulation of the cementitious matrix is first mixed with a liquid, preferably water.

The water/dry formulation ratio is for example comprised between 10 and 30%.

The mesh according to the invention is applied, ensuring that the warp direction of the mesh is arranged in line with the stress to be dissipated.

A layer of mortar is applied to the area of the structure to be reinforced, either manually or mechanically, and the mesh is positioned and press-mounted into the layer of mortar, for example using a trowel, and then the composite system is finished with the application of a final layer (mechanical or manual application).

This operation can be repeated preferably up to three times by overlaying.

Wet Formulation and Method of Preparing Same

According to one aspect thereof, the invention relates to a wet formulation for construction characterized in that it comprises the matrix according to the invention, mixed with a liquid, preferably water.

According to another aspect thereof, the invention relates to a method for preparing the wet formulation according to the invention, characterized in that it essentially consists of mixing a liquid, preferably water, with all or some of the components of the matrix according to the invention, the rest of the components then being incorporated gradually into the mixture if this has not been done previously.

Use of the Mesh According to the Invention

According to another aspect thereof, the invention relates to the use of a mesh according to the invention for consolidating a structure, in particular a reinforced concrete or masonry structure, by press-mounting using a wet formulation according to the invention.

Building or Civil Engineering Structures

The invention also relates to building or civil engineering structures consolidated using the system according to the invention, after mixing the matrix in the form of a dry composition according to the invention with a liquid (preferably water), to obtain a wet formulation according to the invention, used to apply the mesh according to the invention at least once by press-mounting.

Further details and advantageous features of the invention will become apparent below from the description of an example of a non-limitative preferred embodiment of the invention, with reference to the attached figures, in which.

The composite system for consolidating structures, in particular structures made from reinforced concrete or masonry, according to the invention, comprises a hardenable or hardened matrix and a textile reinforcing mesh.

—I— MESH

Structure:

The mesh is labelled 1 on the figures. It is similar to a lattice composed of a non-woven reinforcement 2 and a binding network 3 of this reinforcement 2.

The reinforcement is constituted by flat carbon warp threads 2°c that intersect flat weft threads 2°t also made from carbon.

The binding network 3 is a weave comprising warp elements 3°c and weft elements 3°t.

Figure 3:
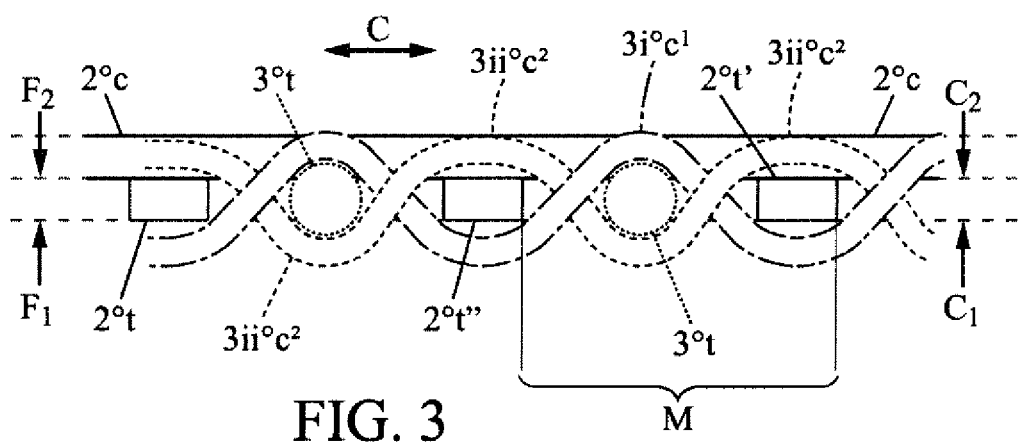
FIG. 3 is a cross-sectional view along the line III-III in FIG. 2.

The warp threads 2°c and the weft threads 2°t of the non-woven reinforcement are overlaid and perpendicular. The layer formed by the warp threads 2°c can be qualified as the bottom layer as it is intended to be applied to the structure to be consolidated, while the top layer is formed by the weft threads 2°t, which have by convention in the present description a Face F1 and a Face F2 as shown in FIG. 3.

The warp threads 2°c are, in this example, simply placed on the weft threads 2°t. They are not secured to each other in their contact areas. The cohesion and geometric regularity of the reinforcement 2 are provided, preferably solely, by the binding network 3. According to variants of the invention, a connection could be made between the warp threads 2°c and the weft threads 2°t, in all or part of their contact areas, for example gluing and/or welding.

The perpendicular arrangement of the warp threads 2°c and the weft threads 2°t is also a preference, but the angle between the warp and the weft could be different from 90°, for example comprised between 30° and 120°, apart from 90°.

The grid defined by the warp threads 2°c and the weft threads 2°t delimits openings 4 (cf. FIGS. 1 and 7) with a substantially rectangular shape in this example, but which could be rhomboid if the warp/weft angle of the reinforcement differs from 90°.

Each warp thread 2°c and weft thread 2°t is constituted by a flat bundle of N carbon filaments. In this preferred embodiment:

- N is approximately equal to 12,000 (800 tex).
- The tensile strength (in MPa) of each thread is approximately 4,900.
- The tensile modulus (in GPa) of each thread is approximately 230.
- The elongation (as a %) of each thread is approximately 2.1.
- The filament diameter is approximately 7 μm.
- The filament density is approximately 1.8.

The warp threads 2°c and weft threads 2°t are preferably identical in this example, but the use of warp threads 2°c that are different from each other and/or weft threads 2°t that are identical or different from each other is not ruled out.

These threads of the reinforcement can in particular correspond to the carbon threads marketed by TORAY CARBON FIBERS EUROPE under product references FT300, T300, T300J, T400H, T700S, T700G, T800H, M35J, M40J, M46J, M55J, M60J, M30S, M40, T1000G, M50J, T600S, or T800S.

The warp elements 3°c and the weft elements 3°t of the binding network 3 together form a weave in which each warp element 3°c comprises two warp binding threads $3i°c$, $3ii°c$ and each weft element 3°t comprises one weft binding thread 3°t. The weave of the binding network 3 is a leno weave.

Figure 2:
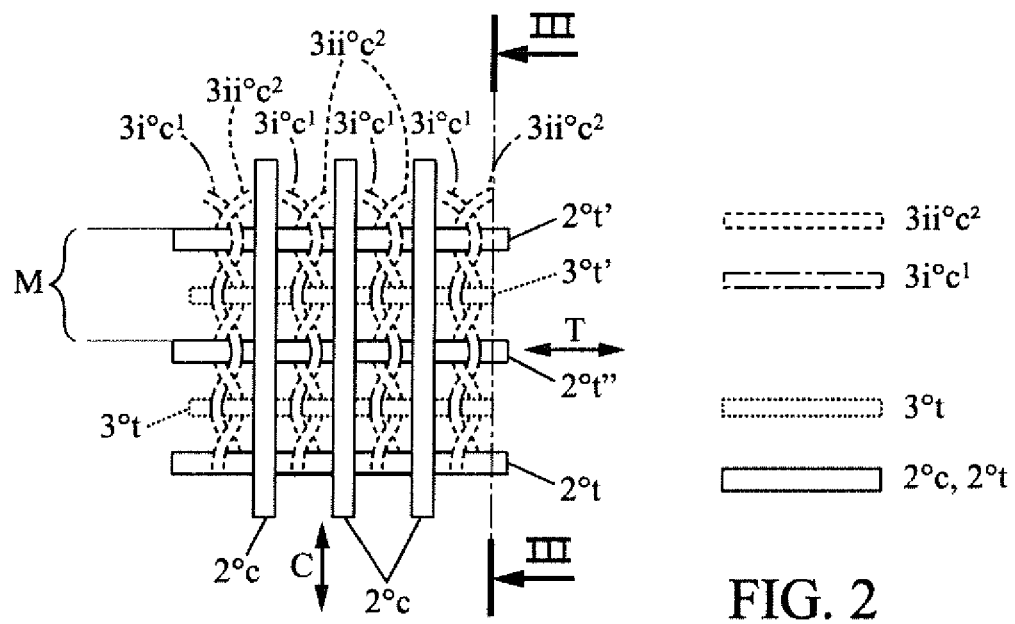
FIG. 2 is a diagrammatic view of the detail in FIG. 1.

As can be seen more clearly in FIGS. 2 & 3, the two warp binding threads $3i°c$ travel all along the warp in the repeating M pattern as shown in FIG. 3:

one of the warp binding threads $3i°c^1$ passes over Face F1 of a weft thread 2°t' of the reinforcement 2, and the other warp binding thread $3ii°c^2$ passes over the other Face F2 of said weft thread 2°t' of the reinforcement 2, so as to clasp the weft thread;

the two warp binding threads $3i°c^1$ & $3ii°c^2$ intersect for the first time in the opening 4 delimited by a segment of the weft thread 2°t', by an opposite segment of the next weft thread 2°t" in the warp direction C in FIGS. 2 & 3 and by the two facing segments of the two corresponding adjacent warp threads 2°c of the reinforcement 2, said opening 4 being crossed by a weft binding thread 3°t, so that, having intersected a first time, the two warp binding threads $3i°c^1$ & $3ii°c^2$ pass on either side of the weft binding thread 3°t, then intersect a second time in the aforementioned opening 4, so that warp binding thread $3i°c$ then passes over Face F1 of the next weft thread 2°t" and warp binding thread $3ii°c^2$ passes over Face F2 of the next weft thread 2°t".

Figure 7:
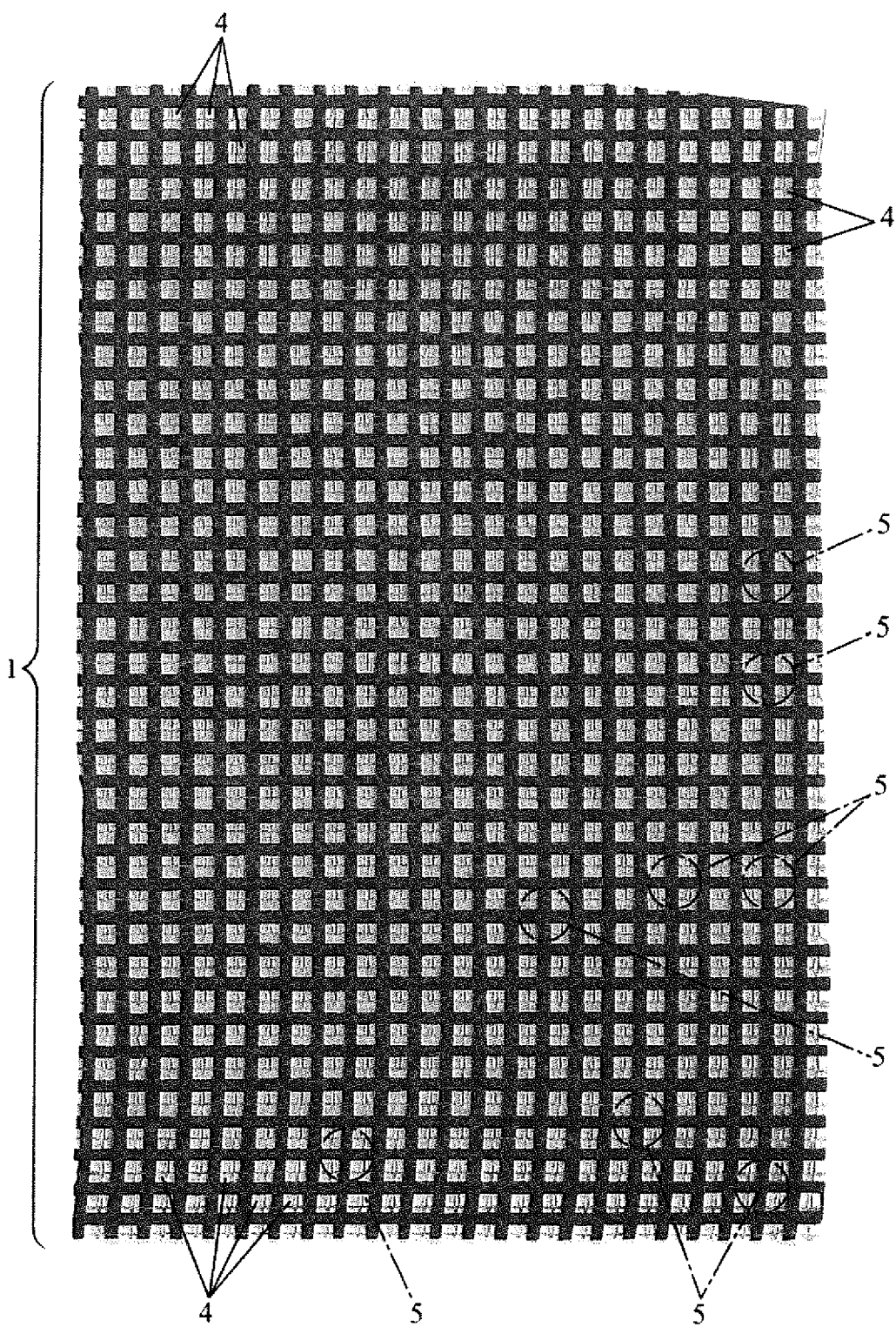
FIG. 7 is front view photograph of the mesh according to the invention.

The warp elements 3°c intersect the weft threads 3°t of the binding network 3 in the openings 4 in the reinforcement 2, and thus also define regular openings 5 (cf. FIG. 7). The warp elements 3°c are substantially perpendicular to the weft threads 3°t of the binding network 3. The warp elements 3°c of the binding network 3 are substantially parallel to the warp threads 2°c of the reinforcement and the weft elements 3°t of the binding network are substantially parallel to the weft threads 2°t of the reinforcement 2.

The carbon threads 2°t of the reinforcement 2 in the weft direction are immobilized by the binding network 3, which ensures the geometric regularity of the assembly.

According to a variant that can be envisaged, the weft elements 3°t of the binding network could comprise, like the warp elements 3°c, two weft binding threads suitable for trapping the warp threads 2°c of the reinforcement 2. This further increases the cohesion, resistance to deformation under stress and regularity of the reinforcement 2.

Each warp thread $3i°c$, $3ii°c$ and weft thread 3°t is preferably constituted by a glass thread. In this preferred embodiment, the size (in tex) of this glass warp binding thread is 35±5, and the size (in tex) of the glass weft binding threads is 75±5. This size of 38 tex on the warp represents 51% of the size of 75 tex on the weft.

These glass binding threads can correspond to the products marketed by FULLTECH FIBER GLASS CORPORATION under product reference ECG 75 1/0 0.7Z 172 SIZING (A-GRADE) and/or ECG 150 1/0 0.7Z 172 SIZING (A-GRADE).

The mesh according to the invention can equally well be applied with the weft or warp threads following the axis of the stress to be distributed (diffused) (the carbon threads of the weft and the warp have almost equivalent performance vis-à-vis taking up strain). The reinforcement can therefore be applied to "take up" bending strain and so-called "shearing" strain.

Manufacture: Weaving/Coating-Impregnation

The mesh 1 composed of the non-woven reinforcement 2 of threads 2°c, 2°t (e.g. carbon) reinforced by the binding network 3, is manufactured as set out below for example using a loom, the production of the reinforcement 2 and the weaving on this reinforcement 2 of the threads $3i°c1$, $3ii°c2$ and 3°t (e.g. glass) using a leno weave of the binding network 3.

Figure 5:
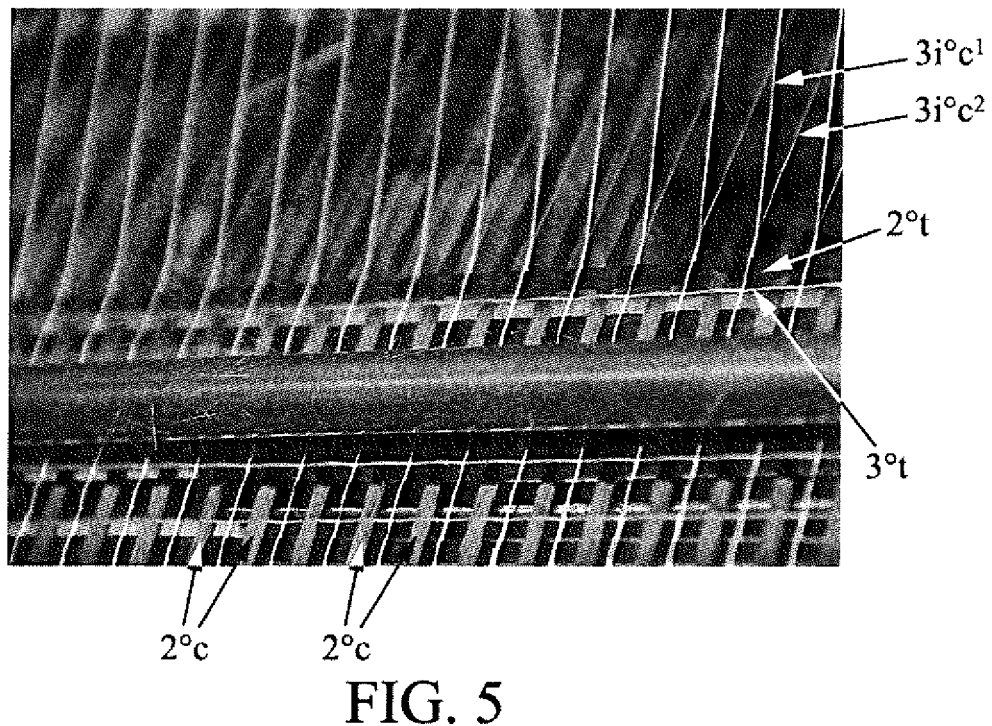
FIG. 5 is a detailed photograph of a step of manufacturing the mesh according to the invention in the loom used to this end.

FIG. 5 shows a detail of the loom, and in particular the warp binding threads $3i°c1$, $3ii°c2$, just after they intersect, before they thus surround a weft binding thread 3°t (not yet engaged in the loom and not shown in FIG. 5), to then intersect again and afterwards surround a weft thread 2°t of the reinforcement 2 (not yet engaged in the loom and not shown in FIG. 5).

The use of the two warp binding threads and the weft binding thread makes it possible to "geometrically" secure the carbon weft threads in the carbon warp threads. In addition, this type of binding results in an even tension in the mesh (warp and weft direction), which enables an even distribution of the threads in all directions. The geometry of each opening 4 in the reinforcement 2 or opening 5 in the binding network 3 is very regular.

The mesh according to this embodiment is coated by impregnation e.g. with a pure acrylic resin the glass transition temperature of which is 25° C., the minimum film formation temperature of which is 14° C. and the solid content of which is 46%.

This coating/impregnation makes it possible to ensure and reinforce the dimensional stability of the assembly and the even distribution of the stresses. This guarantees the efficient collaboration of all of the filaments constituting the carbon threads 2°c of the warp of the reinforcement 2. The coating/impregnation acts as a "fixing agent" that enables the mesh to withstand deformation effectively. This enables an even distribution of the stresses over the surface of the mesh and in each carbon thread, and facilitates the dissipation thereof.

The mesh is preferably, as illustrated in this example, manufactured continuously, which enables effective management of the tensions relating to the manufacturing process (loom). The threads are tensioned uniformly and consistently, and then coated by soaking.

Figure 6:
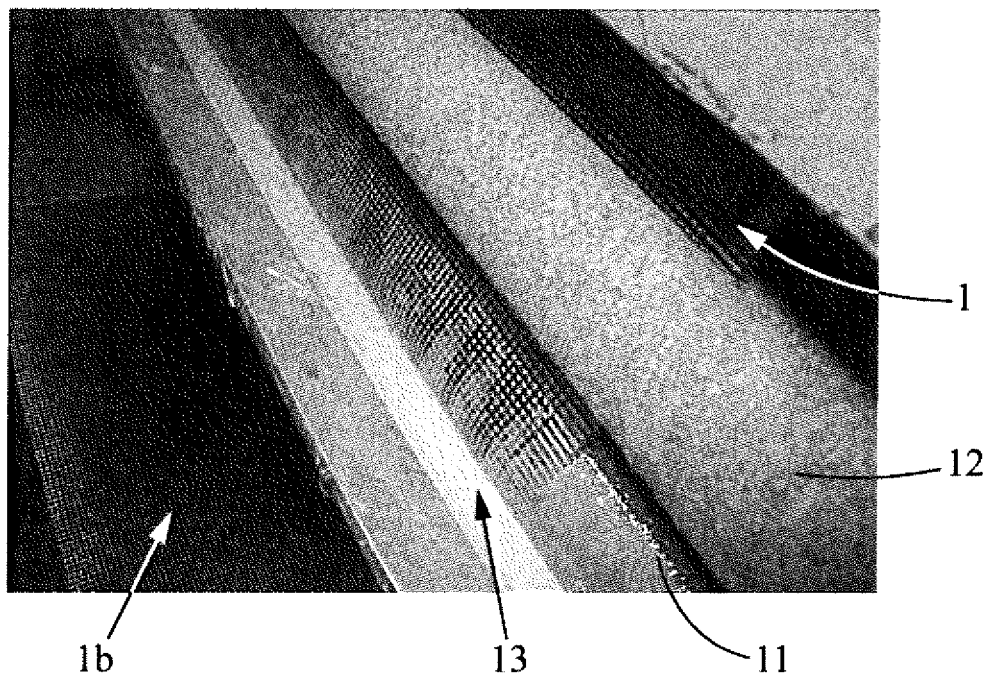
FIG. 6 is a photograph of another step of manufacturing the mesh according to the invention, namely the coating step.

FIG. 6 shows the uncoated mesh 1b passing through the rollers 11, 12 of the coating machine, one of the rollers 11 being associated with a doctor blade one of the edges of which, parallel to the axis of the roller 11, is in contact with the mesh 1, so as to form a receptacle containing a coating bath 13 that impregnates the travelling mesh 1, which then passes between the coating roller 11 and the backing roller 12 so as to remove the excess coating liquid. The coated mesh 1 is dried.

After drying, the mesh is collected and packed into rolls.

The mesh according to the invention can be applied equally with the weft or warp threads following the axis of the stress to be distributed (diffused). The carbon threads of the weft and the warp have almost equivalent performance vis-à-vis taking up strain. The reinforcement can therefore be applied to "take up" bending strain and so-called "shear" strain.

—II— Tests TR and TS

—II.1— Dimensional Stability Under Stress Test ST

II.1.1 Method

This test ST consists of cutting a 40×40 cm square sample E of mesh from a roll of mesh 1.

Figure 4:
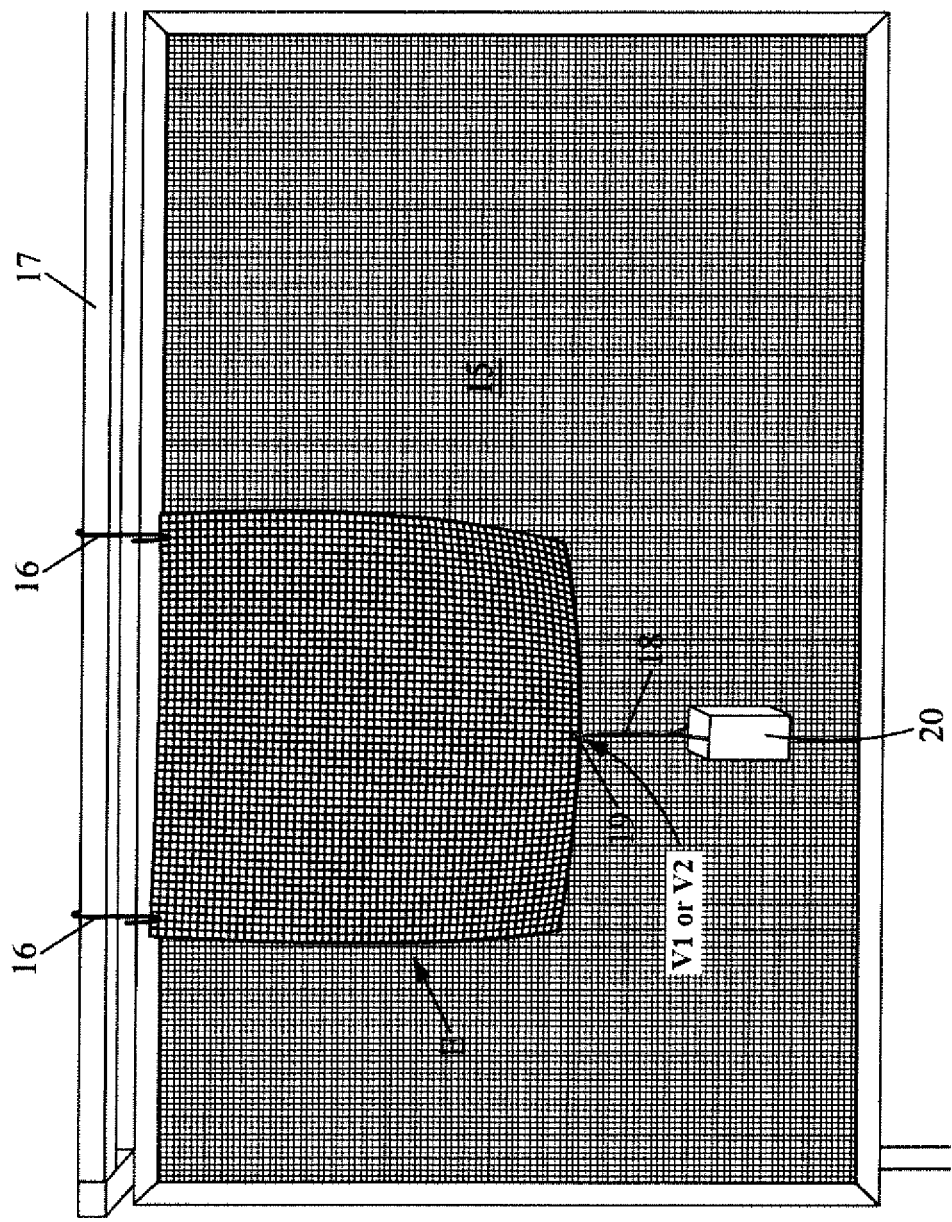
FIG. 4 is a view of the mesh sample according to the invention intended to be subjected to the dimensional stability under stress test ST.

This sample E is shown in FIG. 4.

As can be seen in FIG. 4, the sample E is fastened to a graduated board 15 by means of two hooks 16 on a horizontal bar 17 so that one of the hooks 16 is fixed at a distance of 2.5 cm (at the centre line of the fastening stud glued to the top part of the mesh) from one of the top corners of the sample E, and the other hook at a distance of 2.5 cm from the opposite top corner (from the axis of the fastening hole to the outer edge of the mesh). Each hook 16 is constituted by a threaded rod 6 mm in diameter, bent in order to form a hook.

The bar is produced from a metal section in the shape of an inverted U, the base of which is pierced with a hole. The hook 16 is secured to the U-shaped bar as it passes through it, and is fastened with a nut/lock nut system.

The top edge of the sample E is aligned with the horizontal axis corresponding to the zero line on the graduated board 15.

The middle opening 4 comprised in the bottom end row of holes 4 in the sample E is identified.

This middle opening 4 is the one closest to the centre of this bottom end row of the sample E.

The position of the bottom edge of the sample E situated just below the middle opening 4 is marked on the graduated board 15. The value V0 is read in cm, corresponding to the length between the zero line on the graduated board 15 and the position of the bottom edge marked on the graduated board 15.

A weight 20 of 1 kg or 2 kg is then hung from the centre of the sample E using a hook 18 comprising a curved end 19 that is inserted in the middle opening 4.

The hook 18 is constituted by a metal wire the two ends of which are bent to form a double hook for securing the sample E to the weight.

As soon as the weight 20 has been positioned, the position of the bottom edge of the sample E situated just below the middle opening 4 or 5 is marked on the graduated board 15. The value V1 is read in cm, corresponding to the length between the zero line on the graduated board 15 and the position of the bottom edge marked on the graduated board 15. The deformation of the sample is calculated in cm D1=V1=V0 if the weight 20 is a 1 kg weight.

The deformation of the sample is calculated in cm D2=V2=V0 if the weight 20 is a 2 kg weight.

II.1.2 Results

| V0 = 40 mm | |
|---|---|
| V1 = 40 mm | D1 = 0 |
| V2 = 40 mm | D2 = 0 |

—II.2— Geometric Regularity Test RT

II.2.1 Method

This test RT consists of cutting a 40×40 cm square sample E of mesh from a roll of mesh 1 as obtained immediately after manufacturing and that has not therefore been unrolled or handled. This sample E is shown in FIG. 4.

The area is calculated on a random panel of 20 openings in this sample. If the opening is rectangular, as is the case in the present preferred embodiment, the length and width of each opening is measured and finally, the product of these two dimensions, to give the surface area. In the case of a geometric shape other than a rectangle, the dimension measurements and appropriate calculations are performed.

The standard deviation of the surface area of the openings in the reinforcement on a random panel of 20 openings is calculated.

The openings can be the openings or links 4 of the reinforcement 2 or the openings or links 5 of the binding network 3.

II.2.2 Results

II.2.2.1 Carbon Reinforcement 2

TABLE 1

Figure 1:
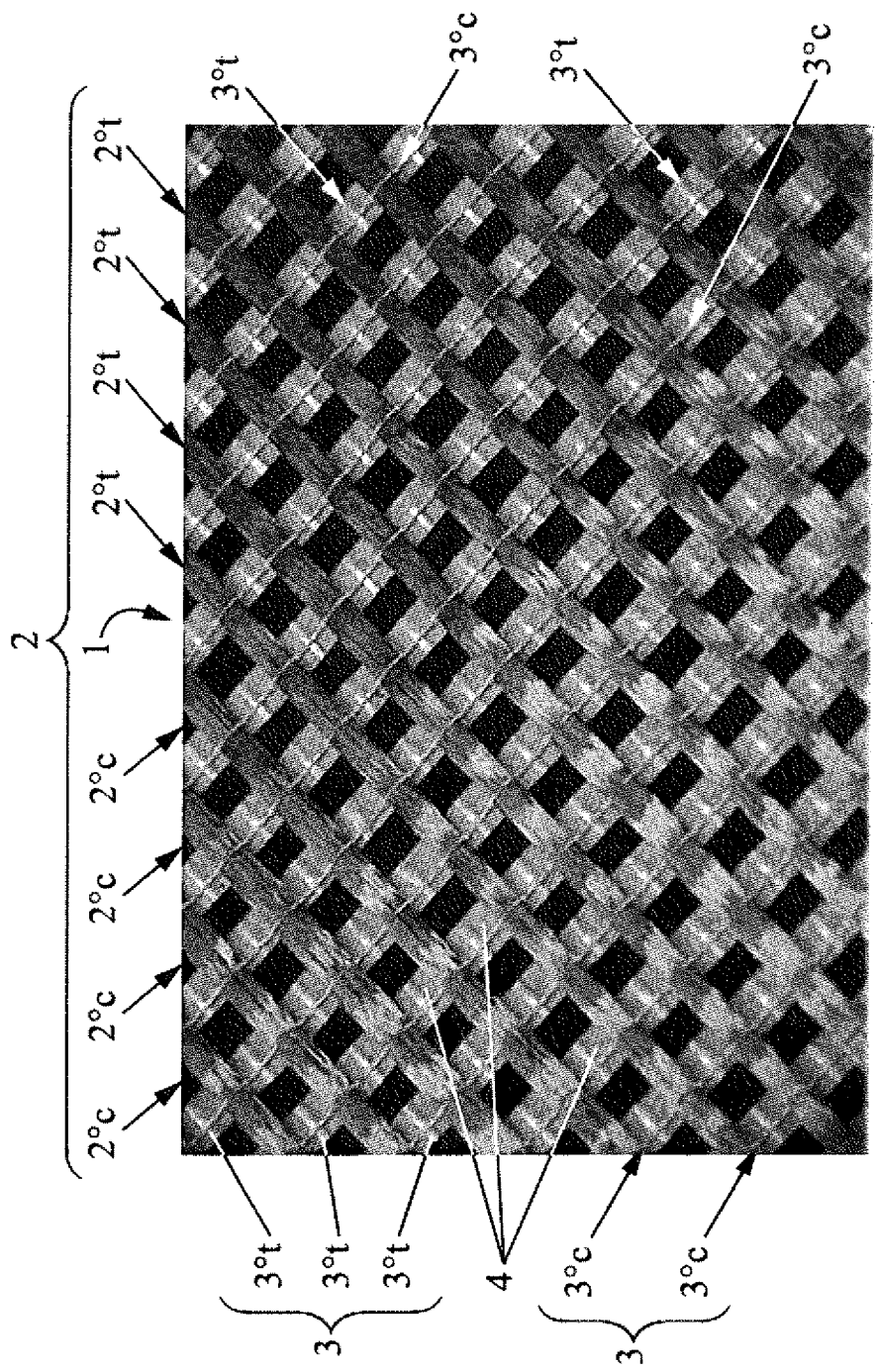
FIG. 1 is a perspective photograph of a preferred embodiment of the mesh according to the invention.

| | Geometric regularity of the carbon reinforcement 2 of the sample E - Link/opening 4 FIG. 1 - | | |
|---|---|---|---|
| Measurements | Side 1 (mm) | Side 2 (mm) | Link area (mm2) |
| 1 | 5.21 | 5.11 | 26.62 |
| 2 | 5.43 | 5.07 | 27.53 |
| 3 | 4.9 | 4.81 | 23.57 |
| 4 | 5.04 | 5.62 | 28.32 |
| 5 | 4.87 | 5.04 | 24.54 |
| 6 | 5.29 | 5.2 | 27.51 |
| 7 | 5.79 | 5.3 | 30.69 |
| 8 | 4.86 | 5.14 | 24.98 |
| 9 | 5.09 | 5.07 | 25.81 |
| 10 | 5 | 5.08 | 25.40 |
| 11 | 5.2 | 5.29 | 27.51 |
| 12 | 4.47 | 5.28 | 23.60 |
| 13 | 5.07 | 5.04 | 25.55 |
| 14 | 5.3 | 5.02 | 26.61 |
| 15 | 5.18 | 5.12 | 26.52 |
| 16 | 5.74 | 5.06 | 29.04 |
| 17 | 5.17 | 5.2 | 26.88 |
| 18 | 4.82 | 5.11 | 24.63 |
| 19 | 4.84 | 5.14 | 24.88 |
| 20 | 5.14 | 5.04 | 25.91 |
| Mean (mm) | 5.12 | 5.14 | / |
| Mean (mm$^2$) | / | / | 26.31 |
| Standard deviation (mm) | 0.31 | 0.16 | / |
| Standard deviation (mm$^2$) | / | / | 1.81 |
| Standard deviation (% relative to the mean) | 6.0 | 3.1 | 6.9 |

Sides 1 & 2 are adjacent.
The link area is calculated as follows: side 1 × side 2

II.2.2.1 Glass Binding Network 3

TABLE 2

Geometric regularity of the glass binding network 3 of the sample E
- Link/opening 5 FIG. 7 -

| Measurements | Side 1 (mm) | Side 2 (mm) | Link area (mm2) |
|---|---|---|---|
| 1 | 7.33 | 7.28 | 53.36 |
| 2 | 7.47 | 7.47 | 55.80 |
| 3 | 7.32 | 7.27 | 53.22 |
| 4 | 7.26 | 7.35 | 53.36 |
| 5 | 7.38 | 7.38 | 54.46 |
| 6 | 7.35 | 7.45 | 54.76 |
| 7 | 7.47 | 7.36 | 54.98 |
| 8 | 7.37 | 7.21 | 53.14 |
| 9 | 7.27 | 7.41 | 53.87 |
| 10 | 7.42 | 7.37 | 54.69 |
| 11 | 7.36 | 7.48 | 55.05 |
| 12 | 7.37 | 7.58 | 55.86 |
| 13 | 7.44 | 7.38 | 54.91 |
| 14 | 7.29 | 7.36 | 53.65 |
| 15 | 7.42 | 7.34 | 54.46 |
| 16 | 7.39 | 7.24 | 53.50 |
| 17 | 7.44 | 7.33 | 54.54 |
| 18 | 7.39 | 7.35 | 54.32 |
| 19 | 7.42 | 7.43 | 55.13 |
| 20 | 7.38 | 7.44 | 54.91 |
| Mean (mm) | 7.38 | 7.37 | / |
| Mean (mm$^2$) | / | / | 54.40 |
| Standard deviation (mm) | 0.06 | 0.09 | / |
| Standard deviation (mm$^2$) | / | / | 0.83 |
| Standard deviation (% relative to the mean) | 0.8 | 1.2 | 1.5 |

1.3 mineral fillers:

1.3.1 calcareous filler: pure crystalline natural calcium carbonate ($CaCO_3 \geq 99\%$) with a Mohs hardness of 3, oil absorption of 20 mL/100 g (ISO 787-5) and a mean diameter of 8 μm.

1.3.2 siliceous fillers:

1.3.2.1 siliceous sand with a particle size of 75-300 μm.

1.3.2.2 siliceous sand with a particle size of 200-800 μm.

1.4 additives:

1.4.1 thickener: amorphous silicic acid with a density of 200 kg/m3 and a specific surface area of 18-22 m$^2$/g.

1.4.2 water-retaining agent: methyl hydroxyethyl cellulose with a Rotovisco viscosity of 20,000-27,000 mPa·s (2%/20° aqueous solution).

—2— Procedure:

3 kg of powder comprising the binder, the resin, the mineral fillers and the additives are prepared and mixed for 3 minutes in a Guedu laboratory mixer (model 4.5 NO) with a working capacity of 3.5 litres at a speed comprised between 545 and 610 rpm.

The 3 kg of powder obtained are mixed with water in a Perrier laboratory mixer for 1 minute at a speed of 140 rpm; the sides of the bowl are then scraped and mixing is continued for 2 minutes at 140 rpm.

TABLE 3 composition (in parts relative to parts of hydraulic binder)

| | | example 1 | | example 2 | | example 3 | | example 4 | |
|---|---|---|---|---|---|---|---|---|---|
| Binder | Hydraulic binder | Portland Cement Calcium oxide | 100 | Portland Cement Calcium oxide | 100 | Portland Cement Calcium oxide | 100 | Portland Cement Calcium oxide | 100 |
| Resin | Redispersible powder resin | Acrylate copolymer | 8.11 | Acrylate copolymer | 8.11 | Acrylate copolymer | 8.11 | Acrylate copolymer | 8.11 |
| Mineral fillers | Calcareous filler | Calcium carbonate | 0 | Calcium carbonate | 27.03 | Calcium carbonate | 0 | Calcium carbonate | 13.51 |
| | Siliceous sands | Silica 75-300 μm | 89.19 | Silica 75-300 μm | 129.73 | Silica 75-300 μm | 94.59 | Silica 75-300 μm | 113.38 |
| | | Silica 200-800 μm | 67.57 | Silica 200-800 μm | 0 | Silica 200-800 μm | 67.57 | Silica 200-800 μm | 32.43 |
| Additives | Rheological agent | Silicic acid | 5.41 | Silicic acid | 5.41 | Silicic acid | 0 | Silicic acid | 2.7 |
| | Water-retaining agent | Methyl hydroxyethyl cellulose | 0 | Methyl hydroxyethyl cellulose | 0 | Methyl hydroxyethyl cellulose | 0 | Methyl hydroxyethyl cellulose | 0.14 |

—III— Cementitious Matrix
—1— Raw Materials 1.1 hydraulic binder:

1.1.1. CEM I 52.5N—SR5 CE PM—CP2 Portland cement, with a density of 3.17 g/cm$^3$ and a Blaine specific surface area of 3,590 cm$^2$/g.

1.1.2. minimum of 93% calcium oxide with an apparent density of the order of 1 and particle size of 0-100 μm.

1.2 resin:

redispersible acrylate copolymer powder resin with a density of 450-650 g/l, a pH of 7-8, a glass transition temperature of +10° C. and a minimum film formation temperature of +0° C. (after redispersion in water).

—IV— Evaluation Tests of the Composite Mesh/Matrix System According to the Invention IV.1 Behaviour Under Quasi-Static Uniaxial Tension: Measuring the Tensile Modulus of Elasticity TME Test Type:

In the absence of a standardized procedure, the identification of the intrinsic properties of the composite mesh/matrix system according to the invention is based on a direct tensile test highly suited to cracking materials that has been verified using a theoretical and experimental approach [1]: R. CONTAMINE, A. SI LARBI, P. HAMELIN "Contribution to direct tensile testing of textile reinforced concrete (TRC) composites". Materials Science and Engineering: A; 528 (2011), pp. 8589-8598.

Figure 8:
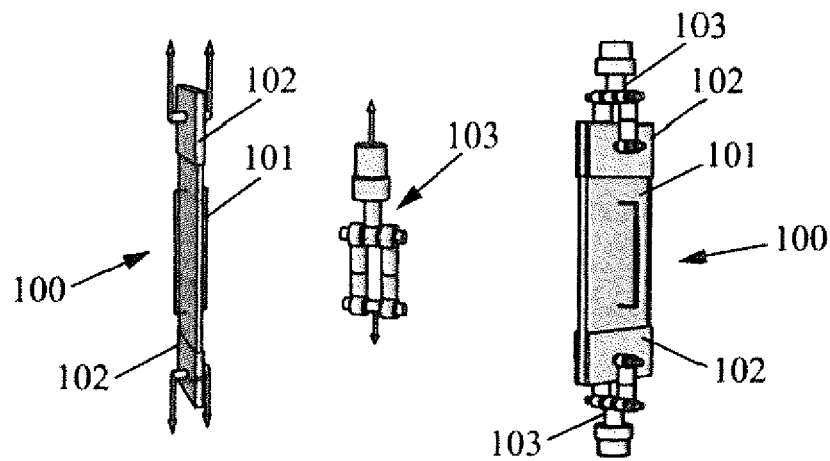
FIG. 8 shows, on the left-hand side, a perspective view of the specimen used in a quasi-static uniaxial tensile test of the behaviour of the composite system according to the invention, on the right-hand side, a perspective view of the specimen with a joint with the test machine at each of the two ends thereof, and in the middle, a detail of this joint.

Test Piece Dimensions:

FIG. 8 shows the test pieces 100, which are composed of a panel 101 of the composite mesh/matrix system (100×500

| Reference | $E_1$ (MPa) | $E_2$ (MPa) | $E_3$ (MPa) | $\sigma_c$ (MPa) | $\sigma_2$ (MPa) | $\sigma_3$ (MPa) | $\sigma_u$ (MPa) | Failure load (daN) |
|---|---|---|---|---|---|---|---|---|
| Specimen 1 | 52000 | 2300 | 114 | 10.6 | 14.1 | 22.1 | 31.4 | 9400 |
| Specimen 2 | 53100 | 2250 | 98 | 9.1 | 13.2 | 20.7 | 28.6 | 8780 |
| Specimen 3 | 53000 | 2350 | 110 | 10.1 | 14.5 | 22.1 | 32 | 9650 |
| Specimen 4 | 53150 | 2190 | 120 | 8.5 | 13.7 | 21 | 30.3 | 9250 |
| Specimen 5 | 53150 | 2290 | 110 | 8.7 | 14.5 | 19.1 | 27.2 | 8160 |
| Specimen 6 | 52900 | 2300 | 100 | 8.4 | 12.9 | 18 | 27.9 | 8470 |
| Mean | 52883.3 | 2280 | 108.67 | 8.93 | 13.8 | 20.5 | 29.4 | 8951.7 |
| Standard deviation | 443.47 | 54.4 | 8.36 | 1.02 | 0.67 | 1.65 | 2.21 | 577.2 |
| Characteristic value | 51916.6 | 2161.4 | 90.45 | 6.71 | 12.35 | 16.9 | 24.5 | 7693.3 | m²) together with aluminium lugs 102 (4×100×100 mm) glued (sanding double sizing with epoxy adhesive on the ends of the panel). These lugs 102 are each connected by a joint 103 to the tensile testing machine. The carbon/glass mesh system according to the invention used comprises a single mesh press-mounted using the cementitious matrix. The thickness of the composite system, once hardened, is 3 mm.

Instrumentation:

The test is carried out on a ZWICK universal testing machine with a capacity of 5 tonnes.

It is a monotonic static test associated with a load increase speed of 1 mm/min (until failure of the specimen).

The instrumentation selected comprises two ±20 mm stroke LVDT displacement sensors that are arranged centred (laterally and height-wise) on the two faces of the specimen. A judiciously arranged force sensor is used to obtain the evolution of the load applied.

Results/Conclusions:

Six identical specimens were produced and tested.

Figure 9:
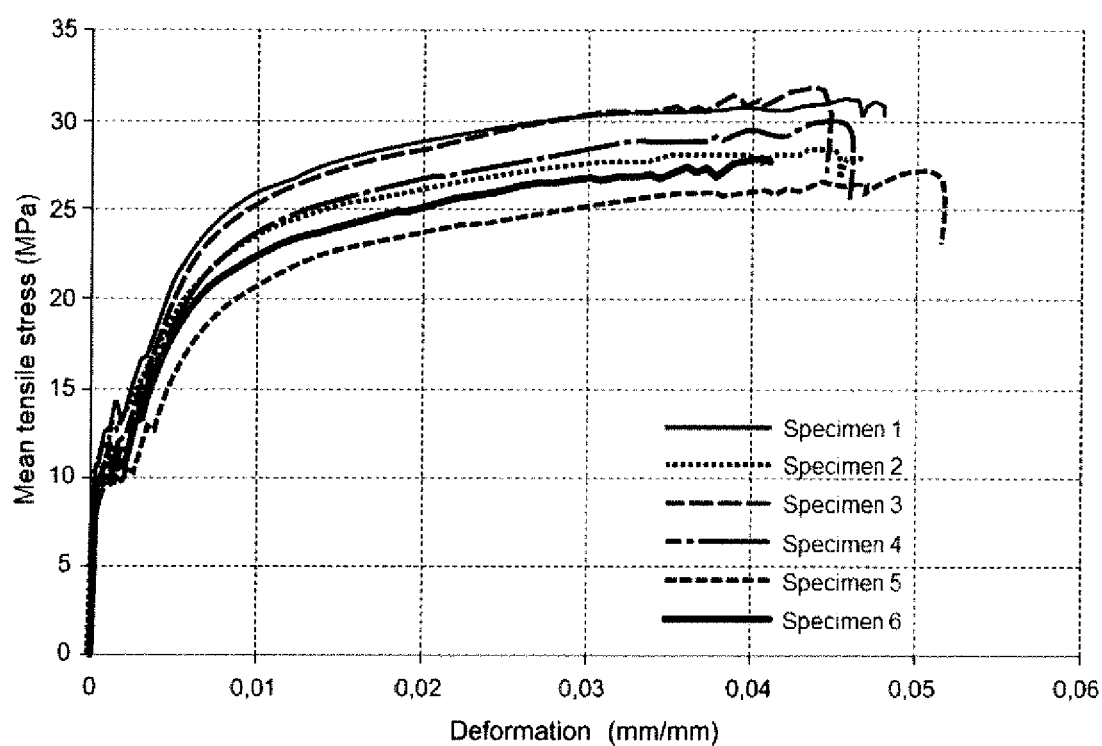
FIG. 9 is a mean tensile stress-strain curve (MPa-mm/mm) in a quasi-static uniaxial tensile test of the behaviour of the composite system according to the invention.

Analysis of the results consists of plotting the stress-strain curve (FIG. 9).

A mean stress (credible hypothesis taking into account the cracking obtained) in the textile/mortar composite was considered:

$$\sigma_c = \frac{F_c}{a \cdot b} \quad (3)$$

a and b: height and width of the specimen respectively.

The mean deformation is given by the ratio of the measured displacement $\Delta L_c$ to the measurement length $l_c$.

$$\varepsilon_c = \frac{\Delta l_c}{l_c} \quad (4)$$

$\Delta l_c$: elongation, $l_c$: distance between sensors (200 mm).

Figure 16:
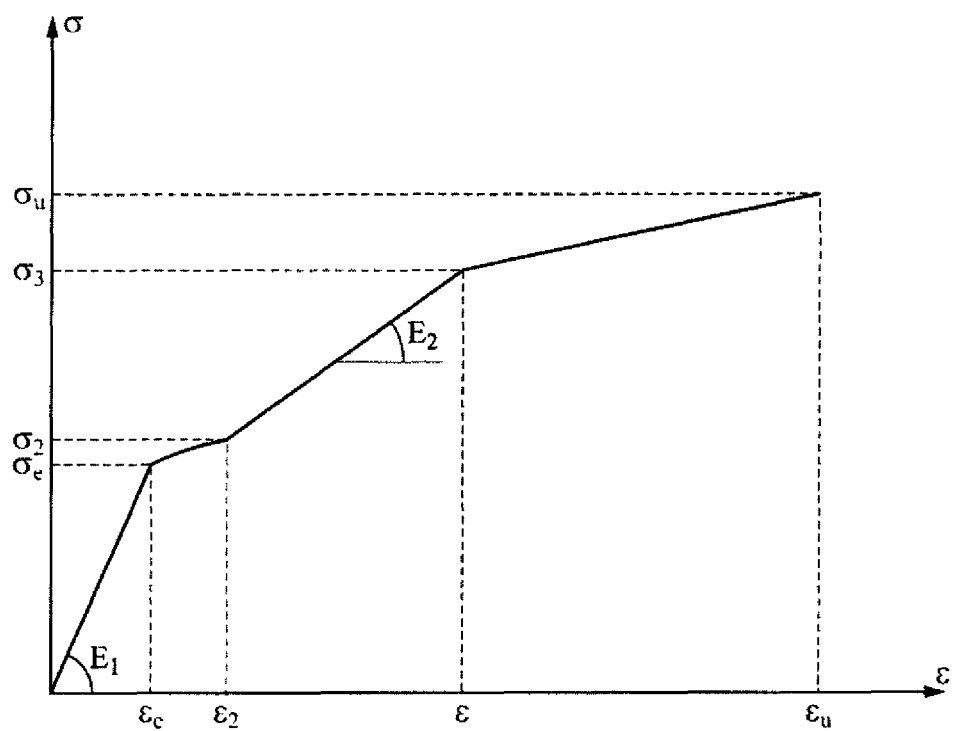
FIG. 16 shows the identification of the mechanical characterisation parameters of the hardened composite structure, in particular the tensile modulus of elasticity TME.

Obvious qualitative similarities can be identified quite clearly on the mean stress-strain curves in that they all exhibit behaviour characterized by four distinct phases. FIG. 16 shows the overall mechanical properties of the textile-mortar composites examined.

The value E1 of the tensile modulus of elasticity TME characterizes the composite structure according to the invention, in particular with regard to the resistance to seismic loads that the structure is capable of imparting to the structures that it consolidates.

The results obtained are as follows:

Both the qualitative and quantitative reproducibility of the results on the six samples thus appears to be established. In addition, the behaviour laws obtained reflect the good performance of the composite mesh/matrix system according to the invention. With respect to both the first zone (stiffness and first cracking strain) and the failure strain (of the order of 30 MPa), the properties obtained are very beneficial. Finally, the relatively high levels of the initial stiffness (of the order of 50,000 MPa) and the first cracking strain suggest very good initial interaction of the elements constituting the composite mesh/matrix system according to the invention.

IV.2 Temperature Stability of the Composite Mesh/Matrix System According to the Invention Test Type:

In the absence of a test procedure specifically designed for textile-mortar systems, the temperature behaviour of the composite mesh/matrix system according to the invention is evaluated by means of a double lap tensile/shear test (parallel concrete blocks assembled on two symmetrical faces using reinforcing materials). This test, which was initially designed for polymer composites, in particular carbon/epoxy composites, is recommended by the working group of the French Civil Engineering Association (AFGC). The sizing of the specimens and the attachment surface are defined with the aim of minimising the effects of local stresses to enable mean stress operation.

Figure 10:
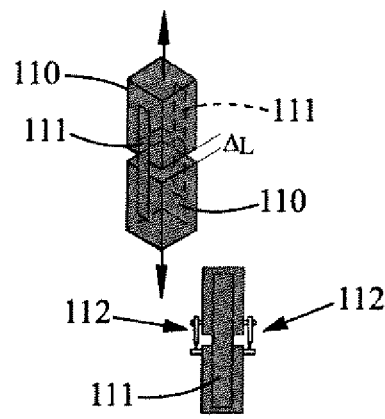
FIG. 10 shows, at the top, a perspective view, and at the bottom, a side view, of the specimen used in a temperature stability test of the composite system according to the invention.

Test Piece Dimensions:

FIG. 10 shows the concrete blocks 110 with dimensions of 140 mm*140 mm*250 mm (concrete prepared and used in accordance with NF EN 18-422). The carbon/glass mesh system according to the invention used comprises a single mesh press-mounted using the cementitious matrix. The thickness of the composite system, once hardened, is 3 mm. The reinforcement system is in the form of two strips 111 each with an anchor length of 200 mm and a width of 50 mm. The strips 111 are arranged on two opposite faces of the two blocks 110 and connect them together while maintaining a separation Δ1 between the two end faces thereof.

Instrumentation:

The separation (displacement) of the two blocks (Δ1) is recorded continuously by LVDT displacement sensors 112 (FIG. 10) with a ±5 mm stroke and an accuracy of 10-4 mm, and the change speed is 1 mm/min.

Results/Conclusions:

Tensile/Shear Test at 2 MPa for 30 Mins at 20° C., 60° C. and 80° C.

The results obtained show the absence of creep of the composite over the entire duration of the test (30 minutes) regardless of the test temperature (20° C., 60° C., 80° C.). This reflects good strength of the composite mesh/matrix reinforcement system according to the invention under thermally stimulated stress.

Tensile/Shear Test at 2 MPa for 12 Hrs at 80° C.

The results obtained confirm the stability of the composite mesh/matrix reinforcement system according to the invention, for an operational working temperature of 80° C. and a shear stress of 2 MPa. After stabilisation due to loading, there was almost no creep of the assembly over a 12-hour period.

IV.3 Exploratory Study of Fatigue of the Composite Mesh/Matrix Reinforcement System According to the Invention Test Type:

In the absence of a standardized procedure relating to the characterisation of textile/mortar composites, the inventors designed a procedure suitable for cracking materials. This is a monotonic static fatigue test. The aim is to evaluate, using direct tensile tests, the ability of the configuration to withstand 1,000 stress cycles. In order to best reflect the stresses to which the composite mesh/matrix reinforcement system according to the invention could be subjected during the repair as closely as possible, undulating fatigue was applied. During a cycle, a variation ranging from 0 to 60% of the maximum tensile stress was therefore applied (0 to 18 MPa).

Test Piece Dimensions:

The test pieces used are the same as the test pieces 100 described above and shown in FIG. 10. The carbon/glass mesh system according to the invention used comprises a single mesh press-mounted using the cementitious matrix. The thickness of the composite system, once hardened, is 3 mm.

Instrumentation:

The test is carried out on a ZWICK universal testing machine with a capacity of 5 tonnes and a load increase speed of 1 mm/min (until failure of the specimen). The instrumentation selected comprises two ±20 mm stroke LVDT displacement sensors that are arranged centred (laterally and height-wise) on the two faces of the specimen. A judiciously arranged force sensor is used to obtain the evolution of the load applied.

Figure 11:
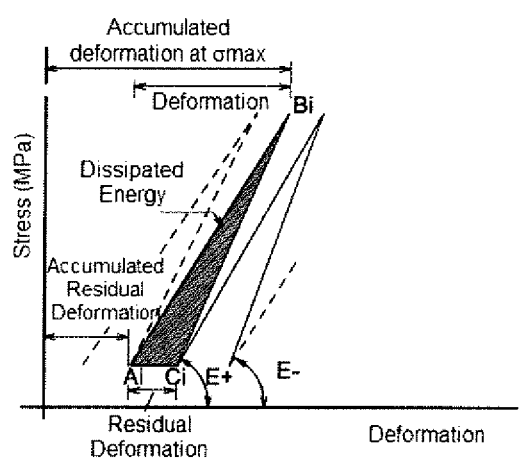
FIG. 11 is a curve showing the evolution of the stiffness of specimens of the type shown in FIG. 8, and enabling an exploratory study of fatigue in the composite mesh/matrix reinforcement system according to the invention.

Results/Conclusions:

The analysis of the results mainly consists of assessing the macroscopic damage to the specimen using the evolution of the stiffness as a reference (ascending Young's modulus E+, descending Young's modulus E−, energy dissipated J, deformation per cycle, accumulated residual deformation, deformation at maximum stress) (FIG. 11).

The evolution of the stiffness (E+ or E−), which is almost constant, highlights the almost complete absence of macroscopic damage to the composite mesh/matrix reinforcement system according to the invention over the 1,000 cycles. This finding clearly reflects the good properties of the composite mesh/matrix reinforcement system according to the invention vis-à-vis 1,000 cycles of static fatigue stress and suggests satisfactory performance for a substantially larger number of cycles.

The energy dissipated per cycle is significantly higher in the first cycle inasmuch as it largely corresponds to the formation of the cracks. After this, it evolves in an almost constant manner over the next 999 cycles. The same mechanisms are mobilized (in stable proportions) as from the second cycle and tend to suggest that any creation of additional cracks as from the second cycle is non-existent or marginal. This latter suggestion seems all the more realistic as it is supported by the evolution of the residual deformation, which remains almost completely stable after the first cycle.

Thus, the composite mesh/matrix reinforcement system according to the invention is entirely suitable for repairing beams vis-à-vis bending stresses (bending moment).

IV.4 Evaluation of the Superficial Cohesion of the Composite Mesh/Matrix Reinforcement System According to the Invention, on a Concrete Substrate Test Type:

In order to verify the performance of the composite mesh/matrix reinforcement system according to the invention vis-à-vis pull-off stresses, superficial cohesion tests were performed in accordance with the procedure described in EN ISO 4624 Paints and varnishes, pull-off test for adhesion, referred to in general standard NF P98-284-1 [September 1992 Tests relating to roadways—Waterproofing products for civil engineering structures—Provoked cracking resistance—Part 1: Tests on poured products bonded to the substrate. The adhesion of the composite on a concrete substrate is thus measured by direct tensile testing].

Test Piece Dimensions:

The concrete used to produce the slabs is defined by a compressive strength at 28 days of at least 30 MPa. The carbon/glass mesh system according to the invention used comprises a single mesh press-mounted using the cementitious matrix. It is applied in a single layer to the surface of the matrix. The thickness of the composite system, once hardened, is 3.0 mm±0.2 mm. Then after coring, six metal pellets are glued on using an epoxy mortar with a tensile strength greater than 10 MPa.

Figure 12:
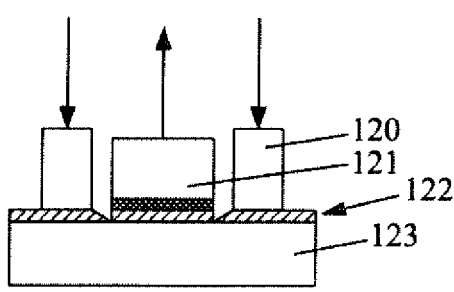
FIG. 12 shows a SATEC adherometer used in an evaluation of the superficial cohesion of the composite system according to the invention, on a concrete substrate.

Instrumentation:

The adherometer used is of the SATEC type (FIG. 12 in which (120): outer ring—(121): metal pellets—(122): composite system—(123): concrete substrate). It is used for the manual application of tensile stress at a constant speed until failure within a period of 90 s.

Results/Conclusions:

The mean bond stress, defined by the ratio of the mean failure load to the nominal area of the patch, is thus calculated. The latter, equal to 2.1 MPa, is greater than 2 MPa. In addition, the failure observed is of the cohesive type; failure in the concrete of the substrate. The combination of these two results confirms that the composite mesh/matrix system according to the invention is suitable for reinforcing concrete structures or masonry structures.

IV.5 Results of Experiments on Bending Beams (Bending Moment) Reinforced with LANKOSTRUCTURE TRM Composite Material Test Type:

The aim is to quantify the performance of the composite mesh/matrix system according to the invention in the case of the repair of a reinforced concrete beam vis-à-vis bending stresses (bending moment). For this evaluation, dimensioning was carried out complying with a regulatory approach and in accordance with the experimental resources available in the laboratory. This dimensioning was carried out at ULS (Ultimate Limit State) and the prerequisites were as follows:

Protection against shear failure

Failure of the reinforced concrete beam at pivot A (evaluation of the reinforcements)

Avoid shear stress interaction (four-point bending)

A maximum failure load of 12 tonnes is thus applied. In addition, the beam is deliberately damaged prior to the implementation of the composite mesh/matrix system according to the invention and the plastification of the tensioned reinforcements (residual deformation rate of the order of 350 µm/m) constitutes the damage criterion applied.

Figure 13:
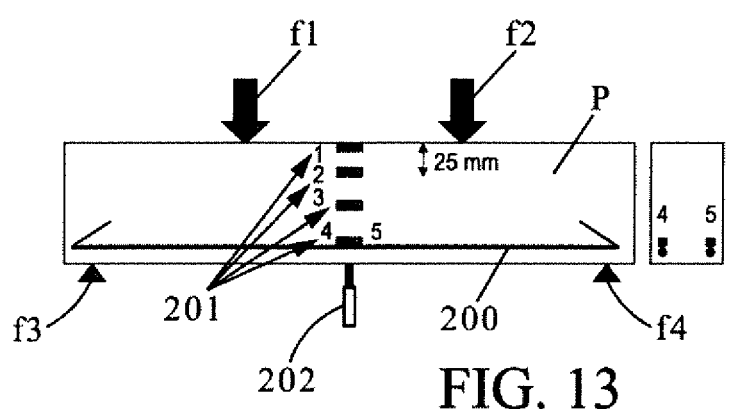
FIG. 13 shows a diagram of a bending bench used in tests to measure the bending moment of bending beams reinforced using the composite system according to the invention.

Test Piece Dimensions:

FIG. 13 shows a beam P reinforced with a carbon/glass mesh system according to the invention that comprises a single mesh press-mounted using the cementitious matrix and is in the form of a strip 200 with a width corresponding to the width of the beam, namely 150 mm, and a length of 195 cm, namely 5 cm shorter than the effective length of the beam being tested, so as to avoid any unwanted contact between the reinforcing element and the support. The thickness of the composite system, once hardened, is 3.0 mm±0.15 mm.

Instrumentation:

The tests are performed on an appropriate bending bench. Bending occurs at four points f1, f2, f3, f4 (cf. FIG. 13) to avoid shear stress in the central portion. The load is applied in a gradual (static) and monotonic manner until failure. Force control is applied (regular load increase). The instrumentation used is constituted by:
- a force sensor with a capacity of 200 kN;
- strain gauges 201 (120 ohms) arranged over the height of the beam P.
- a displacement sensor 202 (LVDT±25 mm) arranged in the centre of the beam. In addition, the comparative evolution of the opening of the cracks in the central portion of the beam is established using an image correlation system.

Figure 14:
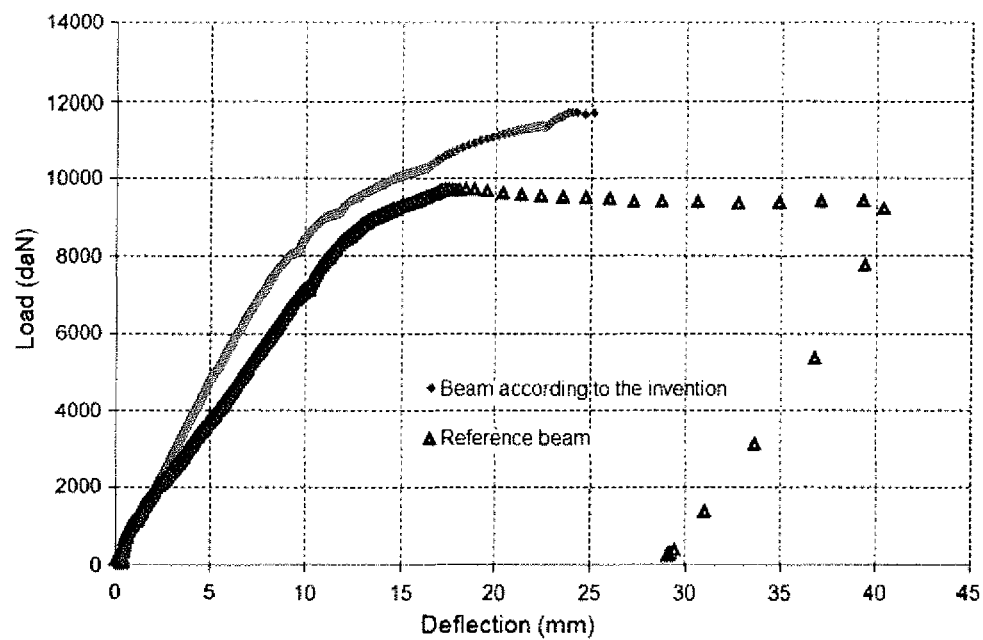
FIG. 14 shows load-deflection curves (daN-mm) measured for beams reinforced or not using the composite system according to the invention and subjected to the bending moment test.

Results/Conclusions:

The load-deflection curves associated with the two beams originating from the same batch (the sound reference beam and the damaged reinforced concrete beam P repaired using the mesh/matrix reinforcement system according to the invention) (FIG. 14) illustrate qualitatively similar behaviours, although the initial stiffness of the beam reinforced with the composite mesh/matrix system according to the invention is lower due to the fact that it was damaged before repair.

Beyond this small zone, which reflects the macroscopic integrity of the reference beam, the gradient of the curve of the beam P reinforced using the composite mesh/matrix system according to the invention, is slightly steeper due to effective bridging of the cracks. A last non-linear zone is then shown, which reflects the progressive degradation of the beam (essentially of the steel reinforcements) and, if applicable, the added reinforcement. From a quantitative point of view, it is clearly apparent that the composite mesh/matrix system according to the invention helps to defer the point of inflexion (known as the "yield point") compared to the reference beam. Thus, an increase of the order of 20% can be seen in terms of load at failure and an increase of the order of 10% is established in terms of yield load of the steel reinforcements.

With regard to the unit crack opening displacement, qualitatively very similar behaviours are also observed. However, the effect of the reinforcement of the composite mesh/matrix system according to the invention is clearly shown. The unit crack opening displacement is reduced very substantially for an equivalent load level, up to high load levels corresponding to those envisaged at SLS (Service Limit State), where the problems linked to the opening of cracks are central.

Test Type:

The aim is to quantify the performance associated with the composite mesh/matrix system according to the invention in the case of the repair of a reinforced concrete beam vis-à-vis shear stresses. For this evaluation, dimensioning was carried out complying with a regulatory approach (BAEL and Eurocode 2) and in accordance with the experimental resources available in the laboratory; the pre-requisites for this dimensioning are as follows:
- Protection against bending moment failure
- Locate the failure on a single side for improved understanding of the physical phenomena
- "Pure" shear failure of the beam (oblique macrocrack)

Test Piece Dimensions:

The composite mesh/matrix reinforcement system according to the invention is applied to the beam in two configurations:
- A single 650 mm continuous strip around the perimeter
- Eight 30 mm-wide strips on the side and bottom faces The effective length of the beams tested is 2 m. The thickness of the composite system, once hardened, is 3.0 mm±0.25 mm.

Figure 15:
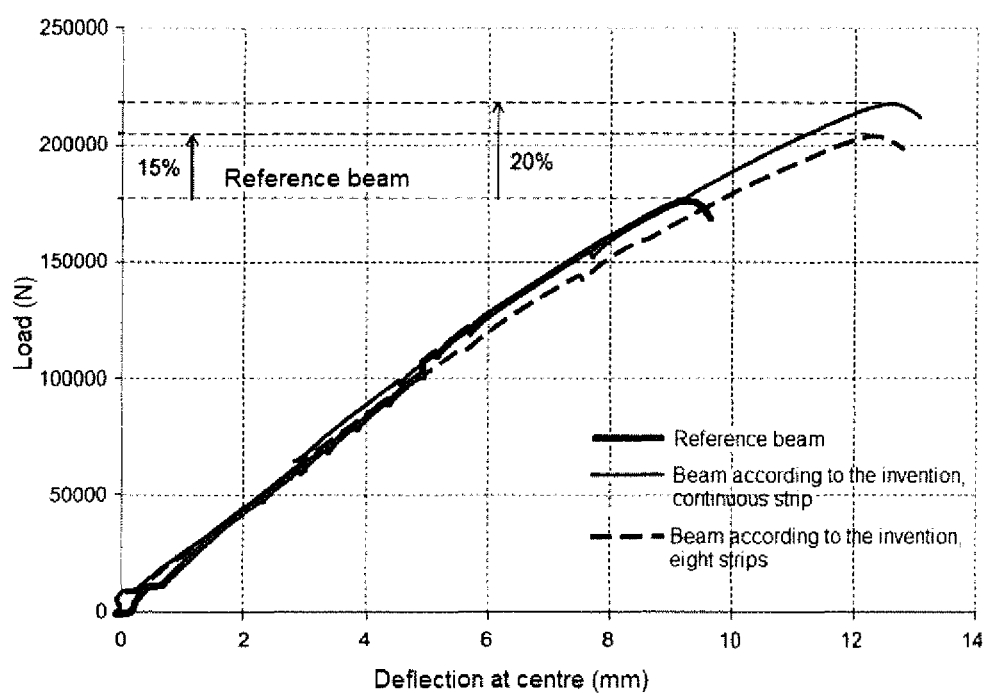
FIG. 15 shows the load-deflection curves (N-mm) obtained in a test to measure the behaviour of reinforced concrete beams, reinforced or not with respect to shear stress, using a composite system according to the invention.

Instrumentation:

The instrumentation is constituted by:
- Two strain gauges (120 ohms) arranged on the reinforcements (one on the transverse steels of the undersized portion, the other glued to the central portion of the longitudinal steels)
- 1 displacement sensor (LVDT±25 mm) positioned at the mid-span of the beams
- 1 force sensor with a capacity of 50 kN Results/Conclusions:

The load-deflection curves obtained confirm the very good properties of the composite mesh/matrix system according to the invention for repair and/or reinforcement vis-à-vis shear stress (FIG. 15).

The composite mesh/matrix system according to the invention contributes significantly to the increase in ultimate load compared to the reference beam. Thus, the differences range roughly from 15 to 20%, which is all the more satisfactory given that only one layer of composite was applied.

In addition, zooming in to a local scale makes it possible to emphasize the suitability of the composite mesh/matrix system reinforcement according to the invention (regardless of the configuration used) for generating a level of deformation of the steel that is very substantially greater than that of the reference beam. This parameter is an indicator of the level of ductility of the structural element.

The invention claimed is:

1. A composite system suitable for consolidating reinforced concrete or masonry structures, the system comprising a hardenable or hardened matrix and a textile reinforcing mesh, the mesh comprising at least one layer formed by:
   - a reinforcement including non-woven and intersecting flat warp threads and flat weft threads; and
   - a binding network woven into the weft threads of the reinforcement,
   - wherein the binding network is configured to ensure a dimensional stability under stress of links of the reinforcement before the mesh is applied to the structure to be consolidated,
   - the binding network of the reinforcement is a leno weave including warp elements and weft elements, each warp element comprising at least two binding threads, and each weft element comprising at least one binding thread, and wherein:
(i) each warp element comprises two warp binding threads and each weft element comprises one weft binding thread,
(ii) one warp binding thread passes on the same side C1 of all of the weft threads of the reinforcement,
(iii) the other warp binding thread passes on the same side C2, opposite C1, of all of the weft threads of the reinforcement, and
(iv) between two successive weft threads of the reinforcement, the warp binding threads intersect before the weft binding thread, pass on either side of weft binding thread and then intersect again to clasp the weft thread of the reinforcement.

2. The composite system according to claim 1, wherein the dimensional stability D1 under stress is 2.5 cm or less, and the dimensional stability D2 under stress is 5 cm or less, where D1 is deformation of a 40×40 cm sample suspended by two top corners of the sample in a vertical plane and subjected to tensile stress of a 1 kg weight attached to a middle of a bottom edge of the sample, and D2 is deformation of a 40×40 cm sample suspended by two top corners of the sample in the vertical plane and subjected to tensile stress of a 2 kg weight attached to the middle of the bottom edge of the sample.

3. The composite system according to claim 1, wherein at least a part of the threads of the mesh are at least one of coated and impregnated with at least one polymer selected from the group consisting of (i) at least one (meth)acrylic (co)polymer selected from the group consisting of alkylester copolymers comprising 1 to 8 carbon atoms, with acrylic acid or methacrylic acid, (ii) at least one vinyl ester (co)polymer selected from the group consisting of vinyl acetate homopolymers and copolymers, (iii) styrene (co)polymers with butadiene or with one or more acrylic esters, and (iv) hot-melt (co)polymers.

4. The composite system according to claim 1, wherein the weft threads and the warp threads of the reinforcement are comprised in two respective parallel planes.

5. The composite system according to claim 1, wherein the hardenable matrix comprises, in parts by weight on dry basis:
100 of binder;
in a range of 1 to 4,000 of mineral fillers;
in a range of 0.01 to 1,000 of at least one resin; and
in a range of 0 to 500 of additives.

6. A consolidation mesh for a structure made from reinforced concrete or masonry, the mesh comprising at least one layer formed by:
a reinforcement including non-woven and intersecting flat warp threads and flat weft threads; and
a binding network woven into the weft threads of the reinforcement,
wherein the binding network is configured to ensure a geometric regularity and a dimensional stability of links of the reinforcement before the mesh is applied to the structure to be consolidated,
the binding network of the reinforcement is a leno weave including warp elements and weft elements, each warp element comprising at least two binding threads, and each weft element comprising at least one binding thread, and
wherein:
(i) each warp element comprises two warp binding threads and each weft element comprises one weft binding thread,
(ii) one warp binding thread passes on the same side C1 of all of the weft threads of the reinforcement,
(iii) the other warp binding thread passes on the same side C2, opposite C1, of all of the weft threads of the reinforcement, and
(iv) between two successive weft threads of the reinforcement, the warp binding threads intersect before the weft binding thread, pass on either side of weft binding thread and then intersect again to clasp the weft thread of the reinforcement.

7. A hardened composite structure obtained using the system according to claim 1.

8. The hardened composite structure according to claim 7, which tensile modulus of elasticity TME is 100,000 MPa or less.

9. A method for increasing the resistance to seismic loads of a reinforced concrete or masonry structure, the method comprising utilizing a composite structure having a tensile modulus of elasticity TME of 100,000 MPa or less, the composite structure being obtained from a composite system for consolidating structures,
wherein the composite system comprises a hardenable or hardened matrix and a textile reinforcing mesh, the mesh comprising at least one layer formed by:
a reinforcement including non-woven and intersecting flat warp threads and flat weft threads, and
a binding network woven into the weft threads of the reinforcement,
the reinforcement has dimensional stability under stress of links of the reinforcement before the mesh is applied to the structure to be consolidated,
the binding network of the reinforcement is a leno weave including warp elements and weft elements, each warp element comprising at least two binding threads, and each weft element comprising at least one binding thread, and
wherein:
(i) each warp element comprises two warp binding threads and each weft element comprises one weft binding thread,
(ii) one warp binding thread passes on the same side C1 of all of the weft threads of the reinforcement,
(iii) the other warp binding thread passes on the same side C2, opposite C1, of all of the weft threads of the reinforcement, and
(iv) between two successive weft threads of the reinforcement, the warp binding threads intersect before the weft binding thread, pass on either side of weft binding thread and then intersect again to clasp the weft thread of the reinforcement.

10. A method for consolidating structures made from reinforced concrete or masonry comprising press-mounting the mesh as defined in claim 1 to the structure with a hardenable or hardened matrix after mixing the matrix with a liquid to obtain a hardenable wet matrix.

11. The method according to claim 10, further comprising spraying the hardenable wet matrix onto the structure, and then positioning the mesh on the unhardened matrix to be press-mounted.

12. The method according to claim 11, wherein the operations of spraying, positioning another mesh and press-mounting are repeated n times, where n is in a range of 1 to 3, and
these operations are carried out on the surface of the unhardened or partly hardened previously sprayed matrix.

13. A method for consolidating a reinforced concrete or masonry structure by press-mounting, the method comprising utilizing a mesh according to claim 6 and a wet formulation-comprising a hardenable or hardened matrix.

* * * * *